United States Patent
Zhou et al.

(10) Patent No.: US 11,750,263 B2
(45) Date of Patent: Sep. 5, 2023

(54) TECHNIQUES FOR APERIODIC BEAM FAILURE DETECTION REFERENCE SIGNALS FOR WIRELESS COMMUNICATIONS SYSTEMS

(71) Applicant: QUALCOMM Incorporated, San Diego, CA (US)

(72) Inventors: Shanyu Zhou, San Diego, CA (US); Jelena Damnjanovic, Del Mar, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/207,496

(22) Filed: Mar. 19, 2021

(65) Prior Publication Data

US 2022/0302983 A1  Sep. 22, 2022

(51) Int. Cl.

| | |
|---|---|
| *H04L 5/00* | (2006.01) |
| *H04W 56/00* | (2009.01) |
| *H04W 76/27* | (2018.01) |
| *H04W 16/28* | (2009.01) |
| *H04W 24/10* | (2009.01) |
| *H04B 7/06* | (2006.01) |

(52) U.S. Cl.
CPC ......... *H04B 7/0695* (2013.01); *H04L 5/0051* (2013.01); *H04W 16/28* (2013.01); *H04W 24/10* (2013.01); *H04W 56/001* (2013.01); *H04W 76/27* (2018.02)

(58) Field of Classification Search
CPC .... H04B 7/0695; H04W 76/27; H04W 16/28; H04W 24/10; H04W 56/001; H04L 5/0051
See application file for complete search history.

(56) References Cited

U.S. PATENT DOCUMENTS

| | | | |
|---|---|---|---|
| 2021/0234601 A1* | 7/2021 | Awadin | H04L 5/0048 |
| 2022/0046740 A1* | 2/2022 | Lo | H04W 72/0413 |
| 2022/0174685 A1* | 6/2022 | Lee | H04B 7/088 |

* cited by examiner

*Primary Examiner* — Derrick V Rose
(74) *Attorney, Agent, or Firm* — Dalei Dong; Holland & Hart LLP

(57) ABSTRACT

Methods, systems, and devices for wireless communications are described. A user equipment (UE) may receive control signaling including a set of parameters. The set of parameters may include one or more thresholds associated with initiating aperiodic beam failure detection (BFD) reference signals (RSs). The UE may receive a set of periodic BFD-RSs. In some examples, the UE or the base station may determine that a triggering threshold is satisfied. In some cases, the UE may determine that the set of periodic BFD-RSs satisfies a consecutive beam failure indication (BFI) threshold, a cumulative BFI threshold, or the like. In some cases, a base station may determine that the set of periodic BFD-RSs satisfies a channel quality threshold. The UE may receive a set of one or more aperiodic BFD-RSs based on whether the triggering threshold is satisfied.

30 Claims, 17 Drawing Sheets

TECHNIQUES FOR APERIODIC BEAM FAILURE DETECTION REFERENCE SIGNALS FOR WIRELESS COMMUNICATIONS SYSTEMS

FIELD OF DISCLOSURE

The present disclosure, for example, relates to wireless communication systems, more particularly to aperiodic beam failure detection reference signals for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some cases, a base station may transmit one or more beam failure detection (BFD) reference signals (RSs) to a UE as part of a beam failure detection procedure. However, such techniques may be deficient. For example, conventional BFD techniques may result in a relatively high signaling overhead or a relatively long time before beam failure recovery is performed.

SUMMARY

The described techniques relate to improved methods, systems, devices, and apparatuses that support aperiodic beam failure detection (BFD) reference signals (RSs) for wireless communications systems. For example, the described techniques may enable a user equipment (UE) or a base station to implement one or more aperiodic BFD-RSs in addition or alternative to periodic BFD-RSs. Such aperiodic BFD-RSs may enable the UE to detect beam failures with relatively high speed while maintaining a relatively low signaling overhead, among other benefits. In some examples, the base station may configure one or more parameters for the aperiodic BFD-RSs using control signaling. For example, the set of parameters may include one or more thresholds associated with initiating aperiodic BFD-RS (e.g., a trigger threshold such as a consecutive beam failure indication (BFI) threshold, a cumulative BFI threshold, or the like), one or more parameters for receiving the aperiodic BFD-RSs (e.g., a number of RSs in a burst, a frequency of RSs in the burst, or other parameters as described herein), or any combination thereof. The UE may receive a set of periodic BFD-RSs. The UE, the base station, or both may determine that the one or more thresholds are satisfied based on receiving the set of periodic BFD-RSs. For example, the UE may determine that a trigger threshold is satisfied (e.g., a quantity of BFIs satisfies a consecutive BFI threshold). The UE may transmit a request for aperiodic BFD-RSs to the base station. In some examples, the base station may initiate transmission of the aperiodic BFD-RSs based on a satisfied trigger threshold (e.g., a channel quality fails to satisfy a channel quality threshold. Such techniques may enable the UE to detect beam failures with relatively high speed and quickly initiate beam recovery procedures, in addition or alternative to other benefits such as enabling the devices to quickly respond to varying wireless channel conditions and reducing overhead in the system, among other examples.

A method for wireless communications at a UE is described. The method may include receiving control signaling indicating a set of parameters including one or more thresholds associated with initiating one or more aperiodic BFD-RSs, receiving a set of periodic BFD-RSs, where the one or more thresholds are satisfied based on the set of periodic BFD-RSs, and receiving the one or more aperiodic BFD-RSs based on the one or more thresholds being satisfied.

An apparatus for wireless communications at a UE is described. The apparatus may include a processor, memory coupled with the processor, and instructions stored in the memory. The instructions may be executable by the processor to cause the apparatus to receive control signaling indicating a set of parameters including one or more thresholds associated with initiating one or more aperiodic BFD-RSs, receive a set of periodic BFD-RSs, where the one or more thresholds are satisfied based on the set of periodic BFD-RSs, and receive the one or more aperiodic BFD-RSs based on the one or more thresholds being satisfied.

Another apparatus for wireless communications at a UE is described. The apparatus may include means for receiving control signaling indicating a set of parameters including one or more thresholds associated with initiating one or more aperiodic BFD-RSs, means for receiving a set of periodic BFD-RSs, where the one or more thresholds are satisfied based on the set of periodic BFD-RSs, and means for receiving the one or more aperiodic BFD-RSs based on the one or more thresholds being satisfied.

A non-transitory computer-readable medium storing code for wireless communications at a UE is described. The code may include instructions executable by a processor to receive control signaling indicating a set of parameters including one or more thresholds associated with initiating one or more aperiodic BFD-RSs, receive a set of periodic BFD-RSs, where the one or more thresholds are satisfied based on the set of periodic BFD-RSs, and receive the one or more aperiodic BFD-RSs based on the one or more thresholds being satisfied.

Some examples of the method, apparatuses, and non-transitory computer-readable medium described herein may further include operations, features, means, or instructions for identifying a triggering threshold associated with the one or more aperiodic BFD-RSs of the one or more thresholds and determining that a quantity of BFIs satisfy the triggering threshold, where receiving the one or more aperiodic BFD-RSs may be based on the triggering threshold being satisfied.

In some examples of the method, apparatuses, and non-transitory computer-readable medium described herein, the triggering threshold includes a threshold quantity of consecutive BFIs, a threshold quantity of cumulative BFIs, or a combination thereof.

Some examples of the method, apparatuses, and non-transitory computer-readable medium described herein may further include operations, features, means, or instructions for identifying a triggering threshold associated with the one or more aperiodic BFD-RSs of the one or more thresholds and determining that one or more measurements satisfy the triggering threshold, where receiving the one or more aperiodic BFD-RSs may be based on the triggering threshold being satisfied.

In some examples of the method, apparatuses, and non-transitory computer-readable medium described herein, the triggering threshold includes a threshold channel quality metric, the one or more measurements include a signal to noise ratio, or a combination thereof.

In some examples of the method, apparatuses, and non-transitory computer-readable medium described herein, receiving the control signaling may include operations, features, means, or instructions for receiving a radio resource control message configuring the UE with the set of parameters.

In some examples of the method, apparatuses, and non-transitory computer-readable medium described herein, the set of parameters includes a consecutive BFI threshold, a cumulative BFI threshold, a quantity of reference signals in a burst of reference signals of the one or more aperiodic BFD-RSs, a periodicity of the burst of reference signals, a time interval between each reference signal of the burst of reference signals, or any combination thereof.

In some examples of the method, apparatuses, and non-transitory computer-readable medium described herein, the control signaling indicates a set of multiple values for a respective parameter of the set of parameters.

Some examples of the method, apparatuses, and non-transitory computer-readable medium described herein may further include operations, features, means, or instructions for receiving a downlink control information (DCI) message, a medium access control (MAC) control element (CE) message, or a combination thereof indicating a value of the set of multiple values for the respective parameter and receiving the set of periodic BFD-RSs, the one or more aperiodic BFD-RSs, or a combination thereof.

Some examples of the method, apparatuses, and non-transitory computer-readable medium described herein may further include operations, features, means, or instructions for determining that the one or more thresholds may be satisfied and transmitting, to a base station, an uplink message requesting the one or more aperiodic BFD-RSs based on determining that the one or more thresholds may be satisfied.

In some examples of the method, apparatuses, and non-transitory computer-readable medium described herein, the uplink message includes a request for a quantity of aperiodic BFD-RSs, a periodicity associated with the quantity of aperiodic BFD-RSs, a time interval between each reference signal of the quantity of aperiodic BFD-RSs, a request to change a periodicity associated with the set of periodic BFD-RSs, or any combination thereof.

Some examples of the method, apparatuses, and non-transitory computer-readable medium described herein may further include operations, features, means, or instructions for receiving, from a base station, a control message indicating the one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof.

In some examples of the method, apparatuses, and non-transitory computer-readable medium described herein, the set of periodic BFD-RSs and the one or more aperiodic BFD-RSs include synchronization signal blocks (SSBs), channel state information reference signals (CSI-RSs), or any combination thereof.

A method for wireless communications at a base station is described. The method may include transmitting control signaling indicating a set of parameters for a beam failure detection procedure, the set of parameters including one or more thresholds associated with initiating one or more aperiodic BFD-RSs, transmitting a set of periodic BFD-RSs, where the one or more thresholds are satisfied based on the set of periodic BFD-RSs, and transmitting the one or more aperiodic BFD-RSs based on the one or more thresholds being satisfied.

An apparatus for wireless communications at a base station is described. The apparatus may include a processor, memory coupled with the processor, and instructions stored in the memory. The instructions may be executable by the processor to cause the apparatus to transmit control signaling indicating a set of parameters for a beam failure detection procedure, the set of parameters including one or more thresholds associated with initiating one or more aperiodic BFD-RSs, transmit a set of periodic BFD-RSs, where the one or more thresholds are satisfied based on the set of periodic BFD-RSs, and transmit the one or more aperiodic BFD-RSs based on the one or more thresholds being satisfied.

Another apparatus for wireless communications at a base station is described. The apparatus may include means for transmitting control signaling indicating a set of parameters for a beam failure detection procedure, the set of parameters including one or more thresholds associated with initiating one or more aperiodic BFD-RSs, means for transmitting a set of periodic BFD-RSs, where the one or more thresholds are satisfied based on the set of periodic BFD-RSs, and means for transmitting the one or more aperiodic BFD-RSs based on the one or more thresholds being satisfied.

A non-transitory computer-readable medium storing code for wireless communications at a base station is described. The code may include instructions executable by a processor to transmit control signaling indicating a set of parameters for a beam failure detection procedure, the set of parameters including one or more thresholds associated with initiating one or more aperiodic BFD-RSs, transmit a set of periodic BFD-RSs, where the one or more thresholds are satisfied based on the set of periodic BFD-RSs, and transmit the one or more aperiodic BFD-RSs based on the one or more thresholds being satisfied.

Some examples of the method, apparatuses, and non-transitory computer-readable medium described herein may further include operations, features, means, or instructions for identifying a triggering threshold associated with the one or more aperiodic BFD-RSs of the one or more thresholds and determining that one or more measurements satisfies the triggering threshold, where transmitting the one or more aperiodic BFD-RSs may be based on the triggering threshold being satisfied.

In some examples of the method, apparatuses, and non-transitory computer-readable medium described herein, the triggering threshold includes a threshold channel quality metric, the one or more measurements include a signal to noise ratio, or a combination thereof.

In some examples of the method, apparatuses, and non-transitory computer-readable medium described herein, transmitting the control signaling may include operations, features, means, or instructions for transmitting a radio resource control message configuring a UE with the set of parameters.

In some examples of the method, apparatuses, and non-transitory computer-readable medium described herein, the set of parameters includes a consecutive BFI threshold, a cumulative BFI threshold, a quantity of reference signals in a burst of reference signals of the one or more aperiodic BFD-RSs, a periodicity of the burst of reference signals, a time interval between each reference signal of the burst of reference signals, or any combination thereof.

In some examples of the method, apparatuses, and non-transitory computer-readable medium described herein, the control signaling indicates a set of multiple values for a respective parameter of the set of parameters.

Some examples of the method, apparatuses, and non-transitory computer-readable medium described herein may further include operations, features, means, or instructions for transmitting a DCI message, a MAC-CE message, or a combination thereof indicating a value of the set of multiple values for the respective parameter and transmitting the set of periodic BFD-RSs, the one or more aperiodic BFD-RSs, or a combination thereof.

Some examples of the method, apparatuses, and non-transitory computer-readable medium described herein may further include operations, features, means, or instructions for receiving, from a UE, an uplink message requesting the one or more aperiodic BFD-RSs based on the one or more thresholds being satisfied.

In some examples of the method, apparatuses, and non-transitory computer-readable medium described herein, the uplink message includes a request for a quantity of aperiodic BFD-RSs, a periodicity associated with the quantity of aperiodic BFD-RSs, a time interval between each reference signal of the quantity of aperiodic BFD-RSs, a request to change a periodicity associated with the set of periodic BFD-RSs, or any combination thereof.

Some examples of the method, apparatuses, and non-transitory computer-readable medium described herein may further include operations, features, means, or instructions for determining that the one or more thresholds may be satisfied and transmitting, to a UE, a control message indicating the one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof.

In some examples of the method, apparatuses, and non-transitory computer-readable medium described herein, the set of periodic BFD-RSs and the one or more aperiodic BFD-RSs include SSBs, CSI-RSs, or any combination thereof.

DETAILED DESCRIPTION

Figure 1:
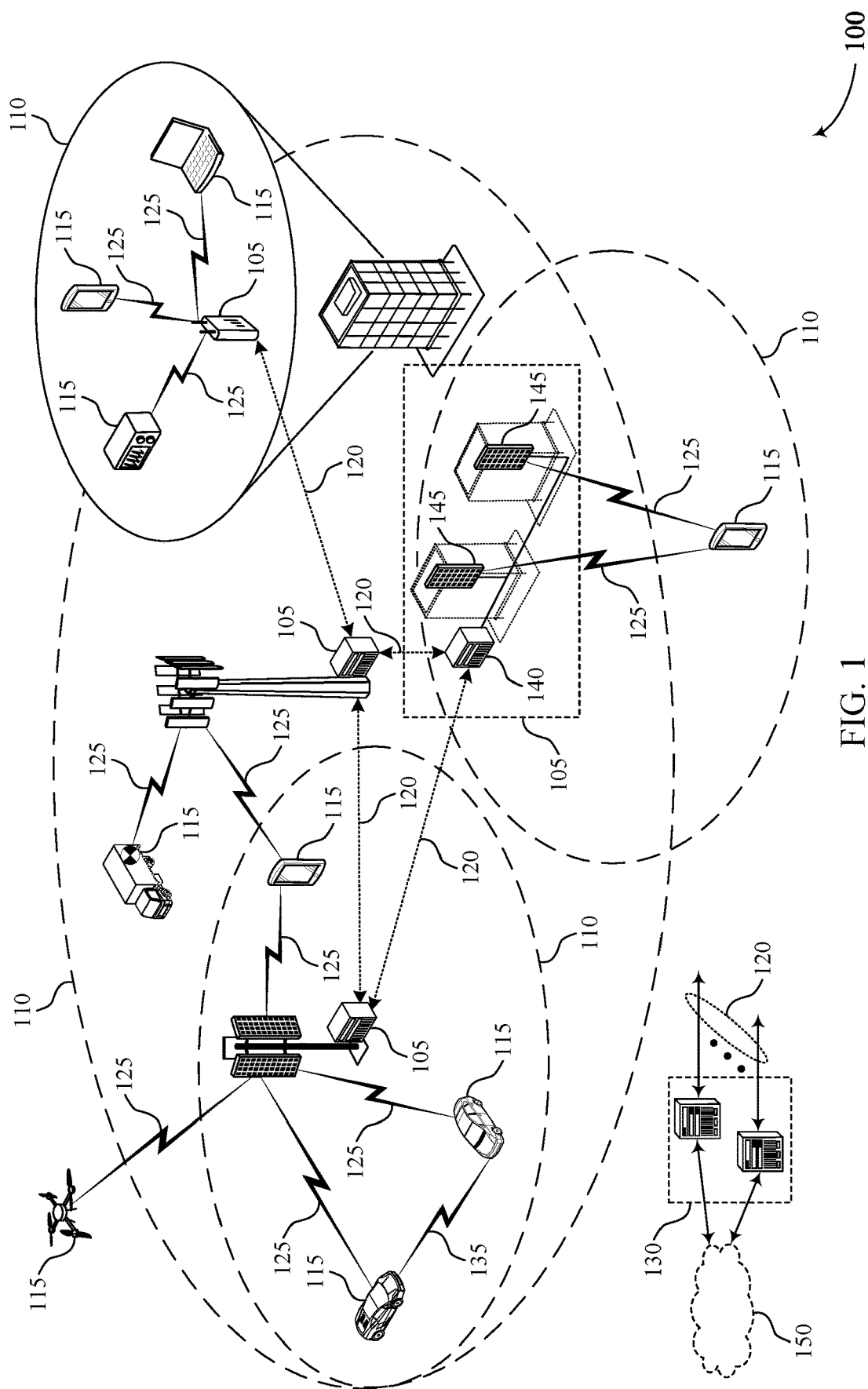
FIG. 1 illustrates an example of a wireless communications system that supports aperiodic beam failure detection reference signals for wireless communications systems in accordance with aspects of the present disclosure.

A wireless communications system may include various communication devices such as a user equipment (UE) and a base station, which may provide wireless communication services to the UE. For example, such a base station may be a next-generation NodeB (referred to as a gNB) that may support multiple radio access technologies including fourth generation (4G) systems, such as 4G Long Term Evolution (LTE), as well as fifth generation (5G) systems, which may be referred to as 5G New Radio (NR).

In some cases, a UE and a base station may communicate using beamforming techniques. For example, the UE and the base station may transmit and receive information on one or more beams. In some cases, the UE may experience one or more beam failures. For example, if the UE and the base station communicate using a beam, the beam may experience signal attenuation (e.g., path loss, penetration loss, blockage loss), which may be influenced by various factors, such as diffraction, propagation environment, density of blockages, material properties, etc. In some cases, channel conditions for the communications may fail to satisfy a threshold due to such signal attenuation. For example, a blockage or other factors may degrade channel conditions and result in a beam failure. In such examples, the UE may be unable to successfully receive or decode communications associated with the beam, which may reduce communications quality, increase latency, and result in a relatively poor user experience.

In some cases, to detect beam failure, the base station may transmit one or more beam failure detection (BFD) reference signals (RSs) to the UE, which the UE may use to determine whether beam failure is present. As an example, the UE may determine beam failure by measuring the signal to interference plus noise ratio (SINR) of each BFD-RS. Upon measuring the SINR, the UE may estimate the block error rate (BLER) of each BFD-RS. The UE may compare the measured BLER to a threshold BLER. If the measured BLER is greater than the threshold, the UE may record a beam failure. That is, the UE may record a beam failure instance, a beam failure indication (BFI), or the like.

However, in some cases BFD techniques may be deficient. For example, the base station may transmit the BFD-RSs periodically and the UE may be configured with a quantity of beam failures to detect before initiating a beam failure recovery procedure. In some cases, the periodic BFD-RSs may occur relatively infrequently, which may result in a relatively long time prior to initiating a beam failure recovery. Alternatively, the periodic BFD-RSs may occur relatively frequently, which may result in inefficient communications (e.g., relatively high signaling overhead).

Accordingly, the techniques described herein may provide for improved BFD-RSs. For example, the described techniques may enable a UE or a base station to implement one or more aperiodic BFD-RSs in addition or alternative to periodic BFD-RSs. Such aperiodic BFD-RSs may enable the UE to detect beam failures with relatively high speed while maintaining a relatively low signaling overhead, among other benefits.

In some examples, the UE may receive control signaling from a base station (e.g., in a radio resource control (RRC) message) indicating a set of parameters. For instance, the UE may receive the set of parameters including a consecutive BFI threshold, a cumulative BFI threshold, a number of BFD-RSs, timing information associated with the number of BFD-RSs, or a combination thereof. The set of parameters may include one or more thresholds associated with initiating aperiodic BFD-RS (e.g., the consecutive BFI threshold, the cumulative BFI threshold, or the like). In some examples, the UE may receive a set of periodic BFD-RSs where either the UE or the base station may determine that a trigger threshold is met based on receiving the set of periodic BFD-RSs.

In some examples, the UE may detect that a trigger threshold is satisfied (e.g., a triggering condition for aperiodic BFD-RSs is met). For example, the UE may identify a triggering threshold of the one or more thresholds. The triggering threshold may be an example of the consecutive BFI threshold, the cumulative BFI threshold, or the like. Upon identifying the triggering threshold, the UE may determine that a quantity of beam failures satisfy the triggering threshold. As such, the UE may transmit, to the base station, an uplink message requesting one or more aperiodic BFD-RSs. The uplink message may include a request for a number of aperiodic BFD-RSs, a periodicity associated with the quantity of aperiodic BFD-RSs, a time interval between each reference signal of the quantity of BFD-RSs, a request to change a periodicity associated with the set of periodic BFD-RSs, or any combination thereof.

In other examples, the base station may detect that a trigger condition is met. For example, the base station may identify a triggering threshold of the one or more thresholds. The triggering threshold may be a channel quality threshold. Upon identifying the triggering threshold, the base station may determine that a channel quality measurement satisfies the triggering threshold. In such a case, the base station may transmit, to the UE, a control message indicating the one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof.

The base station may transmit the one or more aperiodic BFD-RSs to the UE (e.g., in response to the uplink message from the UE or based on determining that the one or more thresholds are satisfied). The UE may receive the one or more aperiodic BFD-RSs, which may enable the UE to detect beam failures with relatively high speed and quickly initiate beam recovery procedures, among other benefits.

Aspects of the disclosure are initially described in the context of wireless communications systems. Aspects of the disclosure are then described in the context of timing diagrams and process flows. Aspects of the disclosure are further illustrated by and described with reference to apparatus diagrams, system diagrams, and flowcharts that relate to aperiodic BFD-RSs for wireless communications systems.

FIG. 1 illustrates an example of a wireless communications system 100 that supports aperiodic beam failure detection reference signals for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive control signaling indicating a set of parameters from a base station 105. For instance, the UE 115 may receive the set of parameters including a consecutive BFI threshold, a cumulative BFI threshold, a number of BFD-RSs, timing information associated with the number of BFD-RSs, or a combination thereof. The set of parameters may include one or more thresholds associated with initiating aperiodic BFD-RS (e.g., the consecutive BFI threshold, the cumulative BFI threshold, or the like). In some examples, the UE 115 may receive a set of periodic BFD-RSs where either the UE 115 or the base station 105 may determine that a trigger condition is met based on receiving the set of periodic BFD-RSs.

In some examples, the UE 115 may detect that a triggering threshold is met. The triggering threshold may be the consecutive BFI threshold, the cumulative BFI threshold, or the like. Upon identifying the triggering threshold, the UE 115 may determine that a quantity of beam failures satisfy the triggering threshold. As such, the UE 115 may transmit, to the base station 105, an uplink message requesting one or more aperiodic BFD-RSs. The uplink message may include a request for a number of aperiodic BFD-RSs, a periodicity associated with the quantity of aperiodic BFD-RSs, a time interval between each reference signal of the quantity of BFD-RSs, a request to change a periodicity associated with the set of periodic BFD-RSs, or a combination thereof.

In other examples, the base station 105 may detect that a trigger condition is met. For example, the base station$_{105}$ may identify a triggering threshold of the one or more thresholds. The triggering threshold may be a channel quality threshold. Upon identifying the triggering threshold, the base station 105 may determine that a channel quality measurement satisfies the triggering threshold. In such a case, the base station 105 may transmit, to the UE 115, a control message indicating the one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof.

In some examples, the base station 105 may transmit the one or more aperiodic BFD-RSs to the UE 115 (e.g., in response to the uplink message from the UE 115 or based on determining that the one or more thresholds are satisfied). The UE 115 may receive the one or more aperiodic BFD-RSs, which may enable the UE 115 to detect beam failures with relatively high speed and quickly initiate beam recovery procedures, among other benefits.

Figure 2:
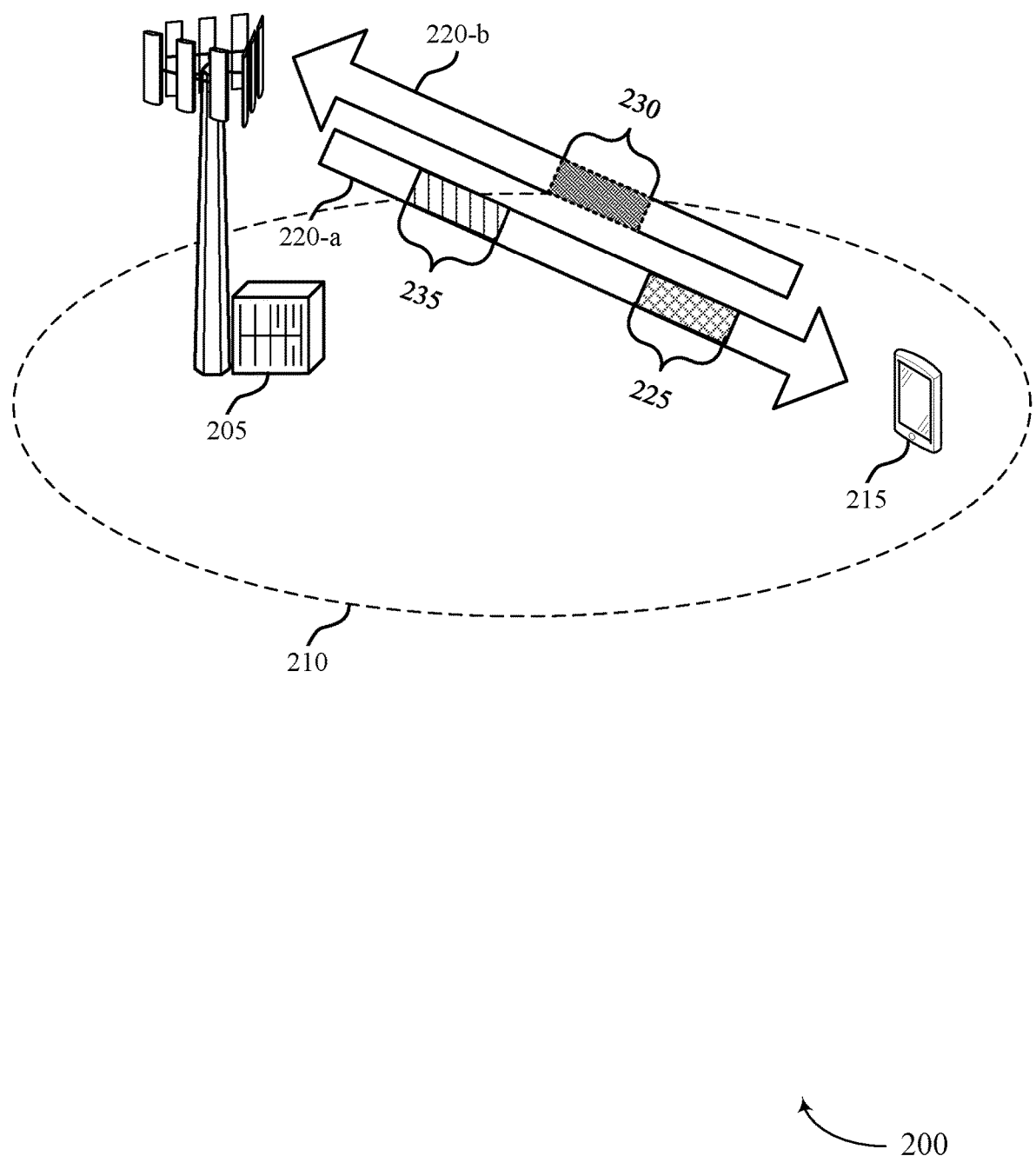
FIG. 2 illustrates an example of a wireless communications system that supports aperiodic beam failure detection reference signals for wireless communications systems in accordance with aspects of the present disclosure.

FIG. 2 illustrates an example of a wireless communications system 200 that supports aperiodic beam failure detection reference signals for wireless communications systems in accordance with aspects of the present disclosure. In some examples, the wireless communications system 200 may implement aspects of the wireless communications system 100 (as shown in FIG. 1) or may be implemented by aspects of the wireless communications system 100 (as shown in FIG. 1). For example, the wireless communications system 200 may include a base station 205 which may be an example of base stations 105 (as shown in FIG. 1). Additionally, the wireless communications system 200 may include a UE 215 which may be an example of UEs 115 (as shown in FIG. 1).

In some cases, the UE 215 may be in a coverage area 210 which may be associated with the base station 205. As such, the base station 205 may communicate with the UE 215 on one or more communication links 220. For example, the base station 205 may transmit signals to the UE 215 on a downlink communication link 220-a and the base station 205 may receive signals from the UE 215 on an uplink communication link 220-b. In some cases, the UE 215 and the base station 205 may communicate using beams to facilitate satisfactory data transmission performance.

For example, the UE 215 and the base station 205 may communicate using beamforming techniques as described herein with reference to FIG. 1. For example, the communication links 220 may be examples of beams, where communication link 220-a and communication link 220-b may be separate beams or the same beam. In some cases, the UE 215 may experience one or more beam failures. For example, if the UE 215 and the base station 205 communicate using a beam, the beam may experience signal attenuation (e.g., path loss, penetration loss, blockage loss), which may be influenced by various factors, such as diffraction, propagation environment, density of blockages, material properties, etc. In some cases, channel conditions for the communications may fail to satisfy a threshold due to such signal attenuation. For example, a blockage or other factors may degrade channel conditions and result in a beam failure. In such examples, the UE 215 may be unable to successfully receive or decode communications associated with the beam, which may reduce communications quality, increase latency, and result in a relatively poor user experience.

In some examples, the UE 215 may detect beam failure using one or more BFD-RSs. For example, the base station 205 may transmit periodic BFD-RSs to the UE 215 and the UE 215 may compare one or more metrics of the BFD-RSs to a threshold to determine whether beam failure has occurred. In some examples, the UE 215 may be configured with a threshold quantity of beam failures. The UE 215 may record a beam failure instance each time a BFD-RS satisfies a threshold (e.g., a channel measurement using the BFD-RS may be lower than a threshold and the UE 215 may determine that a beam failure has occurred based on the channel measurement being lower than the threshold). If the quantity of beam failure instances satisfies a threshold quantity of instances (e.g., a maxCount threshold), the UE 215 may initiate a beam failure recovery procedure. However, in some cases such periodic BFD-RSs may be inefficient, for example, at relatively high carrier frequencies (e.g., beams may be relatively vulnerable to failure at some frequency ranges, such as frequency range 2 (FR2), FR2x, etc.). In some cases, the base station 205 may transmit the periodic BFD-RSs relatively infrequently, which may result in a relatively long time prior to initiating a beam failure recovery. Alternatively, the base station 205 may transmit the periodic BFD-RSs relatively frequently, which may result in inefficient communications (e.g., relatively high signaling overhead).

In accordance with the techniques described herein, the base station 205 may transmit aperiodic BFD-RSs to the UE 215. For example, the described techniques may enable the UE 215 or the base station 205 to implement one or more aperiodic BFD-RSs in addition or alternative to periodic BFD-RSs. Such aperiodic BFD-RSs may enable the UE 215 to detect beam failures with relatively high speed (e.g., capture beam failure and initiate beam failure recovery relatively quickly), while maintaining a relatively low signaling overhead, among other potential benefits.

In some examples, the base station 205 may transmit control signaling 225 indicating a set of parameters to the UE 215. The set of parameters may include one or more thresholds associated with triggering the aperiodic BFD-RSs (e.g., one or more triggering thresholds). Additionally, or alternatively, the set of parameters may include indications of a number of BFD-RSs, a periodicity of the BFD-RSs, a time interval between each BFD-RS, or a combination thereof. For example, the base station 205 may transmit control signaling 225 (e.g., an RRC message, a MAC control element(CE) message, a downlink control information (DCI) message, and the like) configuring the UE 215 with one or more thresholds to trigger aperiodic BFD-RSs, a number of the aperiodic BFD-RSs, a periodicity of the aperiodic BFD-RSs, a time interval between each aperiodic BFD-RS in the burst of BFD-RSs, or a combination thereof, among other examples of parameters (e.g., parameters associated with the periodic BFD-RSs).

The base station 205 may transmit a set of periodic BFD-RSs to the UE 215. Upon receiving the set of periodic BFD-RSs, the UE 215 may determine a beam failure based on measuring one or more metrics, such as signal power metrics, interference metrics, and the like. For example, the UE 215 may measure beam or channel conditions to estimate a channel quality, a signal power of one or more references signals (e.g., BFD-RSs), an interference measurement of the BFD-RSs, or any combination thereof, among other examples of measurements. As an illustrative example, the UE 215 may measure a signal power measurement and an interference measurement (e.g., a SINR, a RSRP, an RSSI, or other measurements) of each BFD-RS of the set of periodic BFD-RSs and comparing the one or more measurements to one or more thresholds. That is, the UE may record a beam failure instance, a BFI, or the like based on a measurement of a respective BFD-RS satisfying a threshold.

In some examples, a device of the wireless communications system 200 may determine that the set of periodic BFD-RSs satisfies a triggering threshold. In an example, the UE 215 may determine that the set of periodic BFD-RSs satisfies a triggering threshold. For example, the UE 215 may identify a triggering threshold to be a consecutive BFI threshold, a cumulative BFI threshold, or the like. In some examples, the UE 215 may be pre-configured or configured (e.g., via control signaling such as RRC signaling) with one or more parameters associated with the triggering threshold. For example, the UE 215 may be configured with a consecutiveCount parameter (e.g., the consecutive BFI threshold where if a consecutive BFI count is larger than the parameter an aperiodic BFD-RS request is triggered). Additionally or alternatively, the UE 215 may be configured with or otherwise identify an AperiodicTriggerRatio parameter. For example, the UE 215 may be configured with or otherwise identify the cumulative BFI threshold. In some examples, the UE 215 may be configured with a threshold quantity for the cumulative BFI threshold (e.g., RRC signaling may indicate a quantity of BFIs for triggering an aperiodic BFD-RS request). In some examples, the UE 215 may be configured with a ratio parameter (e.g., an AperiodicTriggerRatio parameter). For example, the UE 215 may determine if a cumulative BFI count is greater than or equal to the ratio parameter multiplied by a maximum count parameter for initiating beam failure recovery, as represented by the equation BFI count≥AperiodicTriggerRatio*maxCount, where the BFI count refers to the recorded quantity of BFIs, the maxCount refers to a threshold quantity of BFIs for triggering beam failure recovery, and the AperiodicTriggerRatio represents the ratio parameter. In such examples, the UE 215 may trigger an aperiodic BFD-RS request if the BFI count satisfies the threshold. Additionally or alternatively, the cumulative BFI threshold may be determined by configuration of an adjustment parameter, such as an AperiodicTriggerThreshold parameter. In such examples, the UE 215 may determine if a cumulative BFI count is greater than or equal to a difference between the adjustment parameter and a maximum count parameter for initiating beam failure recovery, as represented by the equation BFI count≥maxCount−AperiodicTriggerThreshold, where the BFI count refers to the recorded quantity of BFIs, the maxCount refers to a threshold quantity of BFIs for triggering beam failure recovery, and the AperiodicTriggerThreshold represents the adjustment parameter.

Accordingly, the UE 215 may record a number of beam failures when measuring the set of periodic BFD-RSs. If the number of beam failures satisfies the triggering threshold, the UE 215 may transmit an uplink message 230, to the base station, requesting one or more aperiodic BFD-RSs. Additionally or alternatively, the UE 215 may transmit the uplink message 230, requesting a new periodic BFD-RS periodicity. For example, the UE 215 may not be configured or may not be capable of receiving aperiodic BFD-RS. As such, the UE 215 may transmit the uplink message 230, to the base station 205, requesting an updated periodic BFD-RS periodicity.

In some examples, the UE 215 may determine that the triggering threshold is satisfied based on one or more measurements. For example, the UE 215 may predict a potential beam failure (e.g., a potential BFI) prior to the arrival of a next periodic BFD-RS. As illustrative examples, the UE 215 may use machine learning techniques to predict the beam failure (e.g., based on a previous layer 1 (L1) measurement), the UE 215 may determine that a measurement (e.g., SNR, SINR, or other measurements) satisfies a threshold (e.g., the measurement is less than an aperiodic trigger threshold metric, which may be a parameter configured via RRC signaling or other methods and may be referred to as an AperiodicTriggerThresholdFuture parameter), or any combination thereof. In some cases, the triggering threshold may be a channel quality threshold (e.g., a threshold channel quality metric). The UE 215 may initiate aperiodic BFD-RSs based on the satisfied triggering threshold.

In some examples, the base station 205 may determine a triggering threshold. The triggering threshold may be channel quality threshold. The base station 205 may measure the channel quality of the communication links 220 (e.g., the base station 205 may receive uplink reference signals from the UE 215 and determine a channel quality based on measuring the uplink reference signals). If the channel quality satisfies the channel quality threshold, the base station 205 may trigger aperiodic BFD-RS transmission. For example, if the base station 205 determines or predicts that a channel quality will fall below a threshold, the base station 205 may initiate transmission of the aperiodic BFD-RSs. In some examples, such determination may be based on machine learning (e.g., the base station 205 may apply machine learning to predict a beam failure based on a previous L1 measurement report from the UE) or a report from the UE (e.g., an L1 SNR or SINR report, among other examples of measurement reports) satisfies a threshold metric, such as an aperiodic trigger threshold metric (e.g., an AperiodicTriggerThresholdFuture parameter).

Once aperiodic BFD-RS has been triggered (e.g., by uplink message 230 or by the base station 205), the base station 205 may transmit one or more aperiodic BFD-RSs to the UE 215. In some examples, the base station 205 may send a single BFD-RS. In some examples, the base station 205 may transmit a downlink message 235 including indication of the periodicity of the BFD-RSs, a time interval between each BFD-RS, or the like. In some examples, the base station 205 may reconfigure the periodic BFD-RS periodicity. The base station may reconfigure the periodic BFD-RS periodicity within the downlink message 235.

In some examples, the UE 215 may perform a beam recovery procedure based on detecting beam failure. If a quantity of beam failure instances satisfies a threshold quantity of instances (e.g., a maxCount threshold), the UE 215 may initiate a beam failure recovery procedure. As such, the UE 215 may transmit one or more of a random access channel request or a beam failure recovery request to the base station 205 based on the quantity of beam failure instances satisfying the threshold quantity of instances. If a beam failure is predicted in the near future (e.g., by the UE 215 or the base station 205), using aperiodic BFD-RSs may allow the quantity of beam failure instances to satisfy the threshold quantity of instances faster compared to using periodic BFD-RSs. For example, aperiodic BFD-RSs may increase the frequency of RSs dynamically for a period of time, thereby allowing the quantity of beam failure instances to satisfy the threshold quantity of instances faster compared to using periodic BFD-RSs. Thus, using aperiodic BFD-RSs may result in the UE 215 performing beam recovery procedures sooner.

The techniques described herein may allow devices in the wireless communications system 200 to detect beam failures using aperiodic BFD-RSs, resulting in faster beam failure detection, faster beam recovery, improved communications reliability, and the like.

Figure 3:
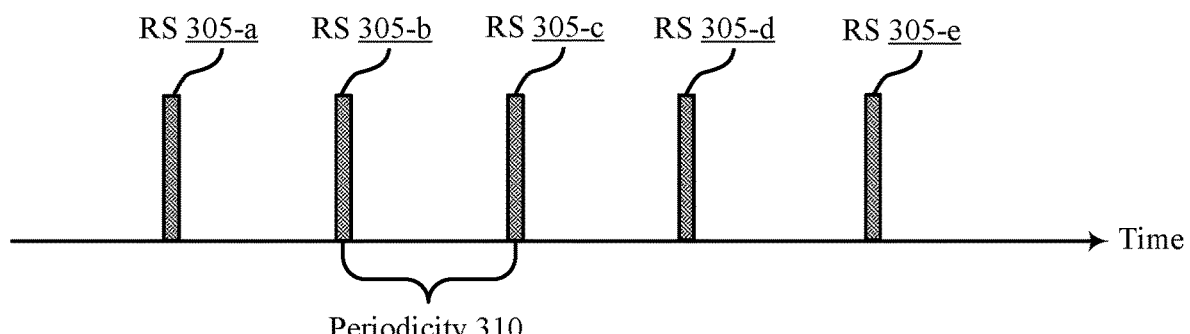
FIG. 3 illustrates an example of a timing diagram that supports aperiodic beam failure detection reference signals for wireless communications systems in accordance with aspects of the present disclosure.

FIG. 3 illustrates an example of a timing diagram 300 that supports aperiodic beam failure detection reference signals for wireless communications systems in accordance with aspects of the present disclosure. In some examples, the timing diagram 300 may implement aspects of the wireless communications system 200 (as shown in FIG. 2). The timing diagram 300 shows an example of periodic BFD-RSs. For example, the RSs 305 may be examples of periodic BFD-RSs which the UE 215 (as shown in FIG. 2) may use to detect beam failures.

In some examples, the base station may transmit one or more RSs 305 (e.g., periodic BFD-RSs) to the UE. To determine beam failure, a UE may measure beam or channel conditions to obtain one or more metrics. For example, the UE may determine a channel quality, a signal power, an interference, or the like associated with one or more respective RSs 305. For example, the UE 215 may measure an interference measurement for each RS 305. In some examples, an interference measurement may refer to or include a signal power measurement, an interference measurement (e.g., SINR), or other measurements of channel or beam conditions. For example, the UE may measure a SINR of each RS 305. Based on measuring the SINR, the UE may estimate a BLER corresponding to the SINR of each RS 305. The UE may compare the estimated BLER to a threshold BLER. If the estimated BLER is greater than or equal to the threshold BLER, the UE may record a beam failure instance. For example, the UE may measure the SINR and estimate the BLER corresponding to the RS 305-*a*, if the BLER exceeds or matches the BLER threshold, the UE may record a beam failure instance for the RS 305-*a*. In some examples, beam failure is determined at the physical layer (e.g., L1 or layer 2 (L2)). The base station may transmit RSs 305 as (or within) a synchronization signal block (SSB), a channel state information (CSI) reference signal (RS), or the like.

In some cases, the number of beam failure instances satisfies a trigger threshold associated with initiating BFD-RSs. For example, the UE may transmit a request for aperiodic BFD-RSs if the number of beam failure instances satisfies a consecutive BFI threshold, a cumulative BFI threshold, or the like. In another example, the base station may initiate aperiodic BFD-RSs if the base station determines that a channel quality fails to satisfy a channel quality threshold, for example, based on receiving uplink reference signals from the UE and determining a channel quality based on measuring the uplink reference signals. Triggering thresholds are described in more detail with reference to FIG. 4.

Additionally or alternatively, the base station and the UE may implement aperiodic RSs 305 as described herein. For example, the base station or the UE may initiate aperiodic BFD-RSs based on the trigger threshold being satisfied (e.g., the UE may transmit a request for aperiodic BFD-RSs if measurements or parameters associated with the periodic BFD-RSs satisfy one or more thresholds, or the base station may determine that a channel quality fails to satisfy a threshold and initiate transmission of the BFD-RSs).

Initiating aperiodic BFD-RSs may increase the frequency of BFD-RSs for a short period of time, allowing the devices to detect beam failure quicker. By implementing such aperiodic BFD-RSs in addition or alternative to the periodic BFD-RSs, the devices may realize improved speed for beam failure detection and recovery, without increasing signaling overhead for a long period of time.

Figure 4:
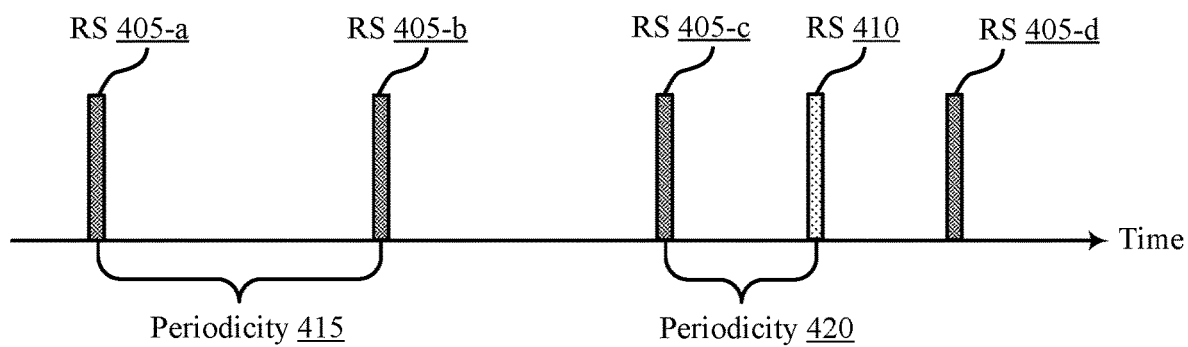
FIG. 4 illustrates an example of a timing diagram that supports aperiodic beam failure detection reference signals for wireless communications systems in accordance with aspects of the present disclosure.

FIG. 4 illustrates an example of a timing diagram 400 that supports aperiodic beam failure detection reference signals for wireless communications systems in accordance with aspects of the present disclosure. In some examples, the timing diagram 400 may implement aspects of the wireless communications system 200 (as shown in FIG. 2). The timing diagram 400 shows an example of both periodic BFD-RSs and aperiodic BFD-RSs. For example, an RS 405-*a*, an RS 405-*b*, an RS 405-*c*, and an RS 405-*d* may all be examples of periodic BFD-RSs which the UE 215 (as shown in FIG. 2) may use to detect beam failures. Further, an aperiodic RS 410 may be an example of an aperiodic BFD-RS which the base station 205 (as shown in FIG. 2) may transmit to the UE 215 (as shown in FIG. 2) upon a triggering threshold being satisfied. In some examples, the timing diagram 400 may implement aspects of the timing diagram 300 (as shown in FIG. 3). For example, the RS 405-*a*, the RS 405-*b*, the RS 405-*c*, and the RS 405-*d* may all be examples of RSs 305 (as shown in FIG. 3).

A base station may transmit the RS 405-*a*, the RS 405-*b*, and the RS 405-*c* to a UE according to a periodicity 415. Upon receiving the RSs 405, the UE may determine the existence of beam failure based on measuring beam or channel conditions such as channel quality, signal power, interference, or the like as described herein. For example, the UE 215 may measure a signal power measurement and an interference measurement (e.g., the SINR) of each RS 405. That is, the UE may record a beam failure instance, a BFI, or the like. In some cases, the UE and the base station may use aperiodic BFD-RSs based on the RSs 405 satisfying a triggering threshold.

In some examples, the UE may determine that the RSs 405 satisfy a triggering threshold. In an example, the triggering threshold may be a consecutive BFI threshold. The UE may record a number of consecutive beam failures when measuring the RSs 405. For example, the UE may record a beam failure for the RS 405-*a*, the RS 405-*b*, and the RS 405-*c*. If the number of beam failures satisfies the consecutive BFI threshold, the UE may transmit an uplink message, to the base station, requesting one or more aperiodic BFD-RSs. In this example, the consecutive BFI threshold may be 2, where upon recording the third beam failure (e.g., the beam failure associated with RS 405-*c*), the UE may transmit the uplink message to the base station. In another example, the triggering threshold may be a cumulative BFI threshold. The UE may record a number of beam failures when measuring the RSs 405. For example, the UE may record a beam failure for the RS 405-*a* and the RS 405-*c*. In this case, the beam failures may be non-consecutive, but in other cases the beam failures may be consecutive. The number of beam failures may approach a maximum number of beam failures (e.g., a maxCount preconfigured at the UE). Before reaching the maximum number of beam failures, the UE 215 may determine that the number of beam failures satisfies the cumulative BFI threshold. In this example, the cumulative BFI threshold may be 1, where upon recording the second beam failure (e.g., the beam failure associated with RS 405-*c*), the UE may transit the uplink message to the base station. Additionally or alternatively, the UE may predict beam failure based on previous measurements. For example, the UE may determine that a number of beam failures satisfies the cumulative BFI threshold and the UE may predict that beam failure may occur in a subsequent RS 405 measurement. Additionally, or alternatively, the UE may predict beam failure based on machine learning techniques.

In other examples, the base station may determine that the RSs 405 satisfy a triggering threshold. In an example, the triggering threshold may be a threshold channel quality. The base station may measure the channel quality of a communication link between the base station and the UE. In some examples, the base station may measure the channel quality of the communication link based on receiving uplink reference signals from the UE 215 and determining a channel quality based on measuring the uplink reference signals. The channel quality measurement may be an interference measurement, a quality of service measurement, a decoding error measurement, or the like. If the channel quality of the communication link satisfies the threshold channel quality, the base station may trigger aperiodic BFD-RS.

Once aperiodic BFD-RS has been triggered (e.g., by the uplink message or by the base station), the base station may transmit one or more aperiodic BFD-RSs, such as aperiodic RS 410 to the UE. In some examples, as illustrated in timing diagram 400, the base station may send a single aperiodic BFD-RS. In some examples, the base station may transmit a number (e.g., a burst) of aperiodic BFD. The base station may transmit a downlink message to the UE including indication of the periodicity, such as periodicity 420, of the aperiodic BFD-RSs, a time interval between each aperiodic BFD-RS, or the like.

As illustrated, aperiodic RS 410 (e.g., the aperiodic BFD-RS) may be transmitted before RS 405-*d* (e.g., the periodic BFD-RS), thereby allowing the UE to detect beam failure faster than if the UE were to wait for RS 405-*d*.

In addition or alternative to using aperiodic BFD-RSs, the base station may reconfigure the periodicity 415 through signaling the downlink message. Reconfiguring the periodicity 415 may allow the base station to transmit RS 405-*d* at an earlier time. For example, the UE may not be configured or capable of receiving aperiodic BFD-RS. As such, the base station may reconfigure the periodicity 415 through signaling the downlink message. Reconfiguring the periodicity 415 may allow the base station to transmit RS 405-*d* at an earlier time.

Figure 5:
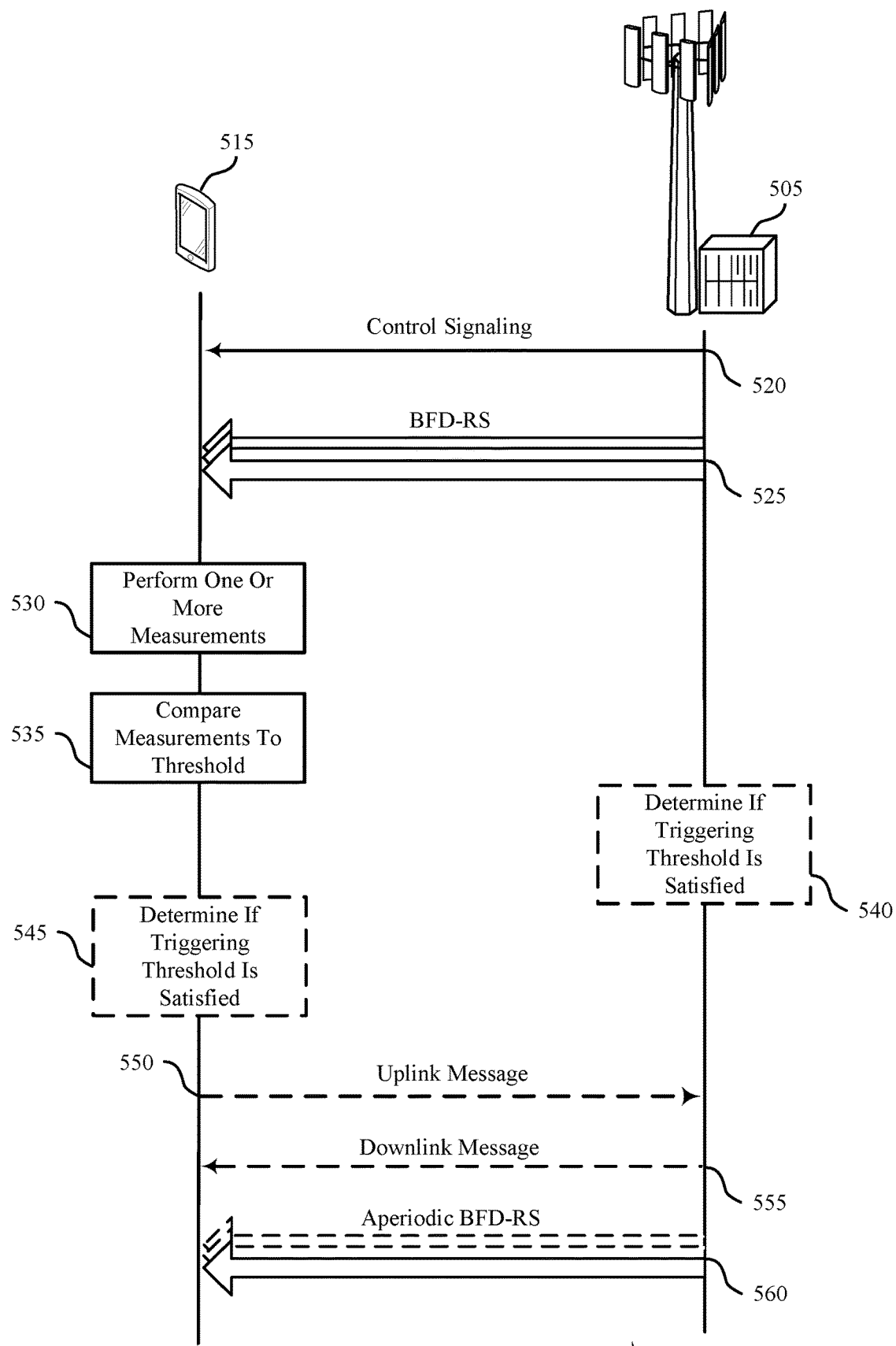
FIG. 5 illustrates an example of a process flow that supports aperiodic beam failure detection reference signals for wireless communications systems in accordance with aspects of the present disclosure.

FIG. 5 illustrates an example of a process flow 500 that supports aperiodic beam failure detection reference signals for wireless communications systems in accordance with aspects of the present disclosure. The process flow 500 may implement aspects of the wireless communications system 100 (as shown in FIG. 1) and wireless communication system 200 (as shown in FIG. 2). For example, the process flow 500 may include a base station 505 and a UE 515, which may be examples of corresponding devices as described herein. In the following description of the process flow 500, the operations between the base station 505 and the UE 515 may be transmitted in a different order than the example order shown, or the operations performed by the base station 505 and the UE 515 may be performed in different orders or at different times. Some operations may also be omitted from the process flow 500, and other operations may be added to the process flow 500.

At 520, the base station 505 may transmit control signaling indicating a set of parameters to the UE 515. The control signaling may be an RRC message (e.g., layer 3 (L3) signaling) including a set of parameters. The set of parameters may include one or more thresholds associated with initiating one or more aperiodic BFD-RSs. The set of parameters may include a consecutive BFI threshold, a cumulative BFI threshold, a number of BFD-RSs in a burst of reference signals of a one or more aperiodic BFD-RSs, a periodicity of the burst of aperiodic reference signals, a time interval between each reference signal of the burst of aperiodic reference signals, an ratio parameter (e.g., an AperiodicTriggerRatio parameter), an adjustment parameter (e.g., an AperiodicTriggerThreshold parameter), a threshold measurement metric (e.g., an AperiodicTriggerThresholdFuture parameter), or any combination thereof as described with reference to FIG. 2. Additionally or alternatively, the set of parameters may include a number of BFD-RSs in a burst of reference signals of a set of periodic BFD-RSs, a periodicity of the burst of periodic reference signals, a time interval between each reference signal of the burst of periodic reference signals, or a combination thereof. In some examples, the control signaling may indicate one or more values (e.g., multiple values) for a respective parameter of the set of parameters. For example, the control signaling may include a table including the set of parameters along with the one or more values corresponding to each parameter (e.g., each parameter may have multiple entries in a table and the base station 505 may indicate a value or entry via control signaling). The UE 515 may receive the control signaling.

At 525, The base station 505 may transmit a set of periodic BFD-RSs to the UE 515. The base station 505 may transmit the BFD-RSs as (or within) an SSB, a CSI-RS, or a combination thereof. The UE 515 may receive the set of periodic BFD-RSs.

At 530, upon receiving the set of periodic BFD-RSs, the UE 515 may perform one or more beam or channel measurements to estimate beam or channel conditions such as a channel quality, a signal power, an interference, or the like as described herein. For example, the UE 215 may determine an interference measurement. In some examples, the UE 515 may determine beam failure based on measuring a signal power and interference (e.g., the SINR, SNR, or other examples of measurements) of each BFD-RS of the set of periodic BFD-RSs.

At 535, the UE 515 may compare the one or more measurements to one or more thresholds. In some examples, the UE 515 may compare a measured BLER associated with the interference measurement to a threshold BLER. If the measured BLER is greater than the threshold BLER, the UE 515 may record a beam failure. That is, the UE 515 may record a beam failure instance, a BFI, or the like. In some cases, the UE 515 and the base station 505 may use aperiodic BFD-RSs based on the set of periodic BFD-RSs satisfying a triggering threshold.

At 540, in some cases, the base station 505 may determine that the triggering threshold is satisfied. In some examples, the base station 505 may identify a triggering threshold of the one or more thresholds associated with initiating one or more aperiodic BFD-RSs. The triggering threshold may be a threshold channel quality and a parameter corresponding to the threshold channel quality may be a channel quality measurement. As such, the base station 505 may determine that the parameter (e.g., one or more measurements at the base station 505 or from a report from the UE 515) satisfies the triggering threshold, where transmitting one or more BFD-RSs is based on the triggering threshold being satisfied. Determining that the triggering threshold is satisfied is described in more detail with reference to FIGS. 2 and 4.

At 545, in some cases, the UE 515 may determine that the triggering threshold is satisfied. In some examples, the UE 515 may identify a triggering threshold of the one or more thresholds associated with initiating one or more aperiodic BFD-RSs. The triggering threshold may be a threshold quantity of consecutive BFIs, a threshold quantity of cumulative BFIs, or a combination thereof. As such, the UE 515 may determine that a quantity of BFIs satisfies the triggering threshold, where receiving one or more BFD-RSs is based on the triggering threshold being satisfied. Determining that the triggering threshold is satisfied is described in more detail with reference to FIGS. 2 and 4.

At 550, if the UE 515 determines that the triggering threshold is satisfied, the UE 515 may transmit an uplink message (e.g., an aperiodic BFD-RS request) to the base station 505. In some examples, the UE 515 may transmit the request via uplink control signaling. In some examples, the uplink message may include a request for a one time BFD-RS. Alternatively, the uplink message may include a request for a number (e.g., a burst) of aperiodic BFD-RSs. The UE 515 may specify a periodicity associated with the number of aperiodic BFD-RSs, a time interval between each reference signal of the quantity of aperiodic BFD-RSs, a request to change a periodicity associated with the set of periodic BFD-RSs, or any combination thereof, within the uplink message. Additionally or alternatively, the uplink message may include a request to change the periodic BFD-RS periodicity.

At 555, in some cases, the base station 505 may transmit a downlink message to the UE 515. The downlink message may indicate one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof. The base station 205 may reconfigure the periodic BFD-RS periodicity in the downlink message 235. In some examples, the downlink message may be a control message (e.g., an RRC message). In other examples, the downlink message may be a physical layer message such as a DCI message, a MAC-CE message, or the like, including one or more values for a parameter of the set of parameters from the control signaling. The UE may receive the downlink message. Additionally or alternatively, the downlink message may be a DCI message, a MAC-CE message, or the like, including an indication of a value of the set of values configured through the control signaling at 520. For example, the downlink message may indicate a value in the table including the set of parameters and the values corresponding to each parameter configured through the control signaling at 520.

At 560, the base station 505 may transmit one or more aperiodic BFD-RSs to the UE 515. The base station 505 may transmit the aperiodic BFD-RSs as (or within) an SSB, a CSI-RS, or a combination thereof. The base station 505 may transmit the one or more aperiodic BFD-RSs based on the triggering threshold being satisfied. In some examples, the base station 505 may transmit the one or more aperiodic BFD-RSs based on receiving the uplink message at 550. In other examples, the base station 505 may transmit the one or more aperiodic BFD-RSs based on a triggering threshold being satisfied (e.g., the channel quality threshold), such as at 540. In some examples, the base station 505 may transmit the one or more aperiodic BFD-RSs according to the information transmitted in the downlink message at 555. The UE 515 may receive the one or more aperiodic BFD-RSs, thereby allowing the UE 515 to quickly detect beam failure without significantly increasing signaling overhead. The use of aperiodic BFD-RSs, may result in lower latency communications, less connection reestablishment procedures, and more efficient system function.

Figure 6:
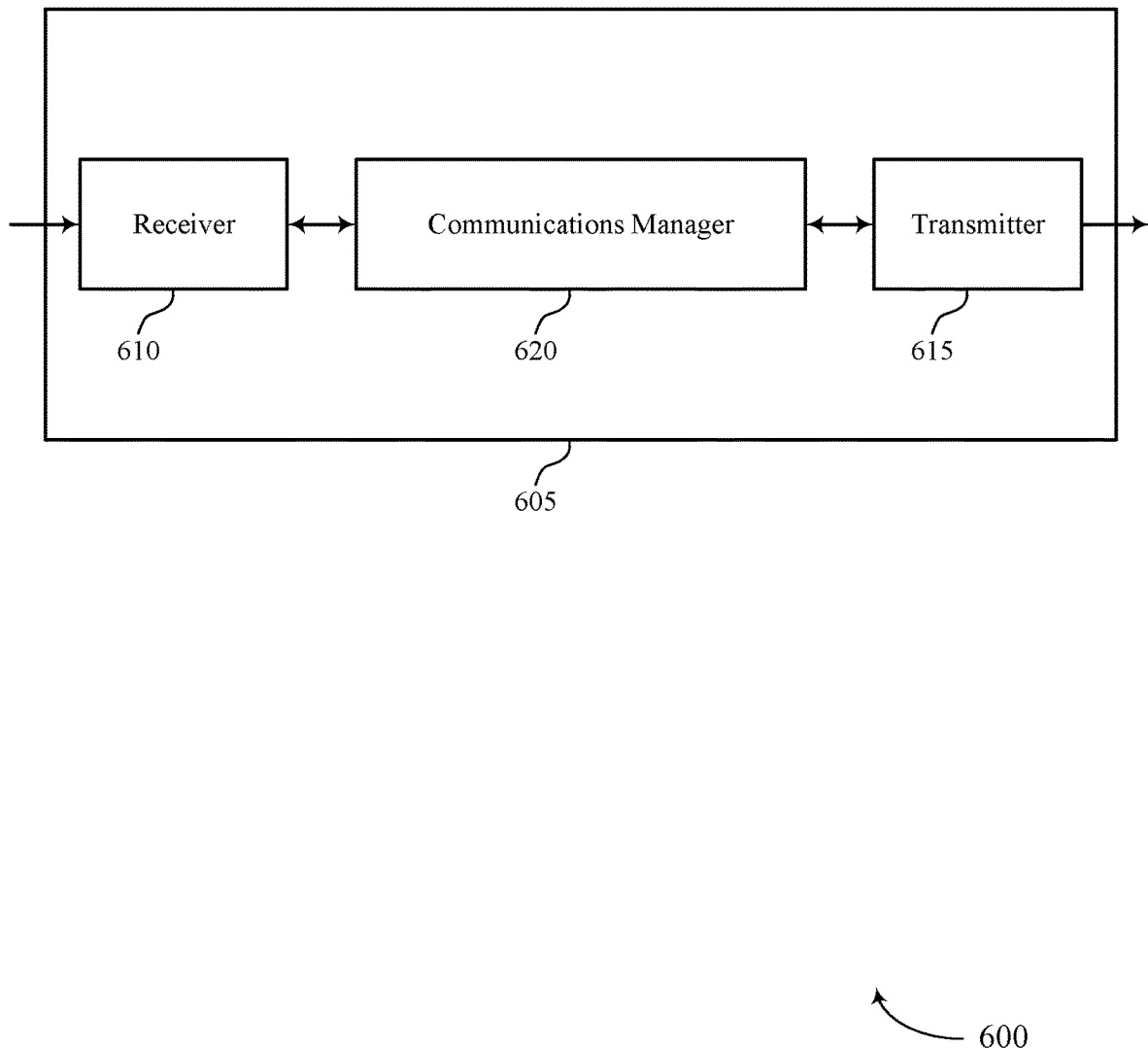
FIGS. 6 and 7 show block diagrams of devices that support aperiodic beam failure detection reference signals for wireless communications systems in accordance with aspects of the present disclosure.

FIG. 6 shows a block diagram 600 of a device 605 that supports aperiodic beam failure detection reference signals for wireless communications systems in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to aperiodic BFD-RSs for wireless communications systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to aperiodic BFD-RSs for wireless communications systems). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of aperiodic BFD-RSs for wireless communications systems as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving control signaling indicating a set of parameters including one or more thresholds associated with initiating one or more aperiodic BFD-RSs. The communications manager 620 may be configured as or otherwise support a means for receiving a set of periodic BFD-RSs, where the one or more thresholds are satisfied based on the set of periodic BFD-RSs. The communications manager 620 may be configured as or otherwise support a means for receiving the one or more aperiodic BFD-RSs based on the one or more thresholds being satisfied.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for faster beam failure detection, lower latency at the UE, and more efficient communications.

Figure 7:
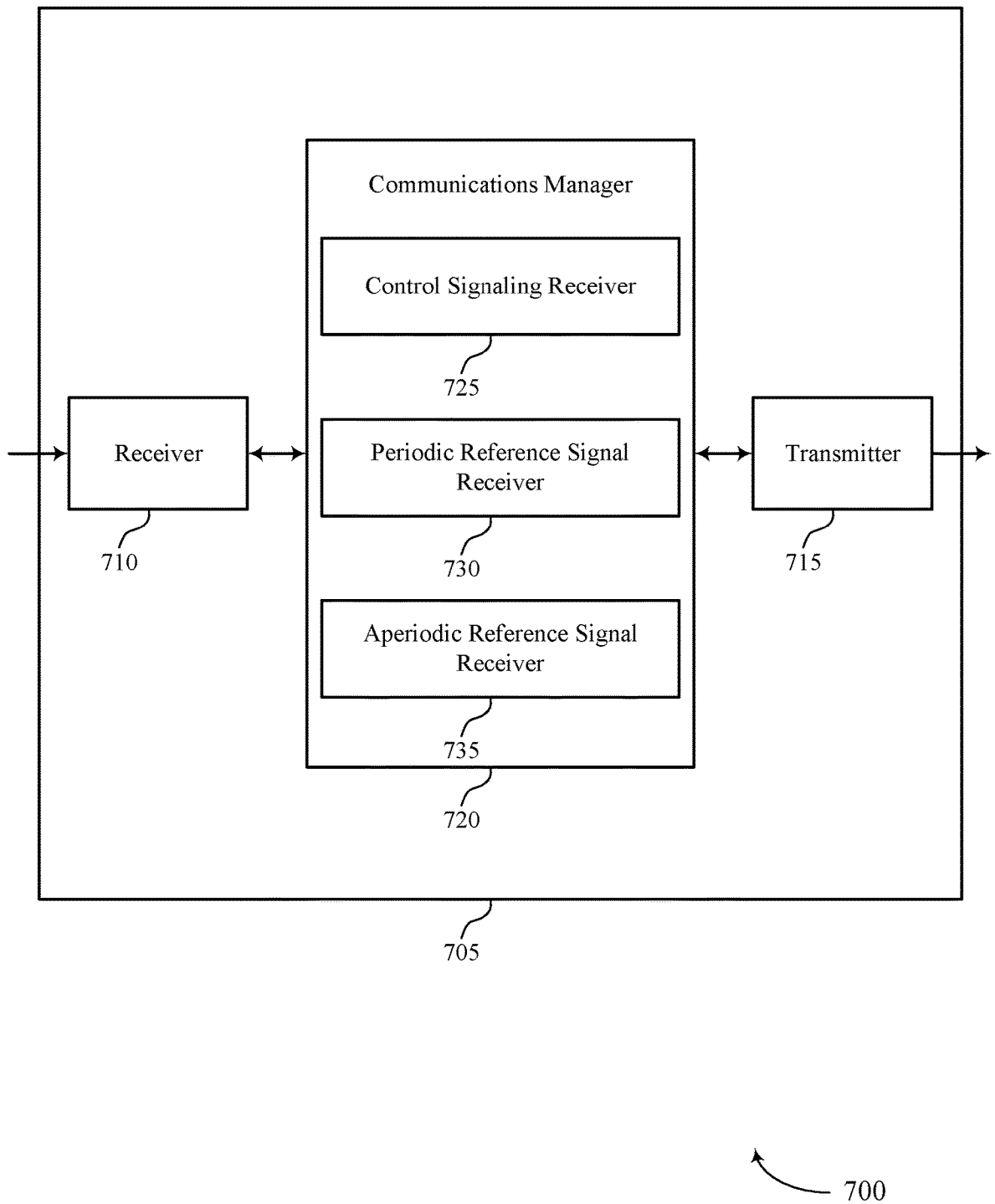

FIG. 7 shows a block diagram 700 of a device 705 that supports aperiodic beam failure detection reference signals for wireless communications systems in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to aperiodic BFD-RSs for wireless communications systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to aperiodic BFD-RSs for wireless communications systems). In some examples, the transmitter

715 may be co-located with a receiver 710 in a transceiver component. The transmitter 715 may utilize a single antenna or a set of multiple antennas.

The device 705, or various components thereof, may be an example of means for performing various aspects of aperiodic BFD-RSs for wireless communications systems as described herein. For example, the communications manager 720 may include a control signaling receiver 725, a periodic reference signal receiver 730, an aperiodic reference signal receiver 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The control signaling receiver 725 may be configured as or otherwise support a means for receiving control signaling indicating a set of parameters including one or more thresholds associated with initiating one or more aperiodic BFD-RSs. The periodic reference signal receiver 730 may be configured as or otherwise support a means for receiving a set of periodic BFD-RSs, where the one or more thresholds are satisfied based on the set of periodic BFD-RSs. The aperiodic reference signal receiver 735 may be configured as or otherwise support a means for receiving the one or more aperiodic BFD-RSs based on the one or more thresholds being satisfied.

Figure 8:
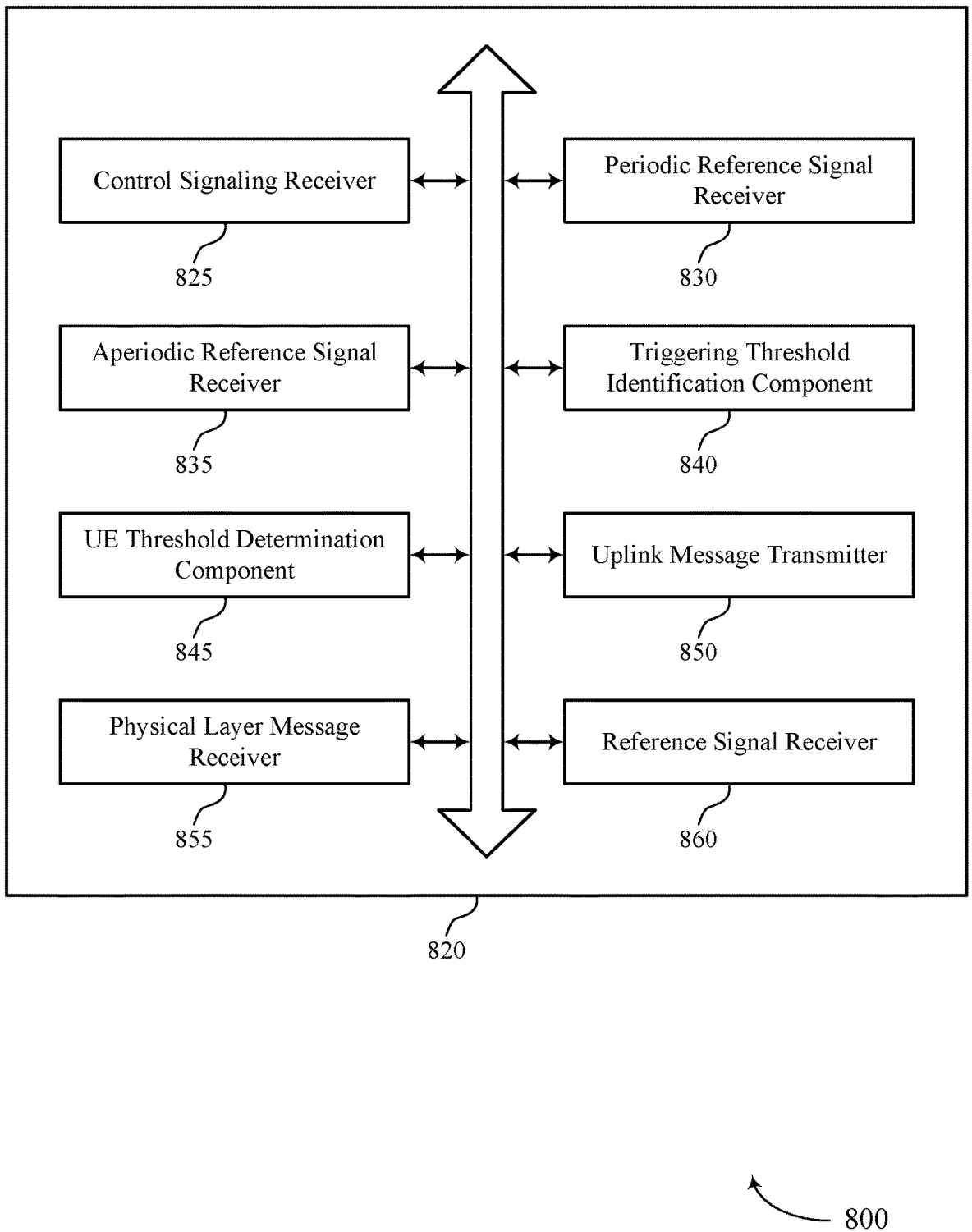
FIG. 8 shows a block diagram of a communications manager that supports aperiodic beam failure detection reference signals for wireless communications systems in accordance with aspects of the present disclosure.

FIG. 8 shows a block diagram 800 of a communications manager 820 that supports aperiodic beam failure detection reference signals for wireless communications systems in accordance with aspects of the present disclosure. The communications manager 820 may be an example of aspects of a communications manager 620, a communications manager 720, or both, as described herein. The communications manager 820, or various components thereof, may be an example of means for performing various aspects of aperiodic BFD-RSs for wireless communications systems as described herein. For example, the communications manager 820 may include a control signaling receiver 825, a periodic reference signal receiver 830, an aperiodic reference signal receiver 835, a triggering threshold identification component 840, a UE threshold determination component 845, an uplink message transmitter 850, a physical layer message receiver 855, a reference signal receiver 860, or any combination thereof. Each of these components may communicate, directly or indirectly, with one another (e.g., via one or more buses).

The communications manager 820 may support wireless communications at a UE in accordance with examples as disclosed herein. The control signaling receiver 825 may be configured as or otherwise support a means for receiving control signaling indicating a set of parameters including one or more thresholds associated with initiating one or more aperiodic BFD-RSs. The periodic reference signal receiver 830 may be configured as or otherwise support a means for receiving a set of periodic BFD-RSs, where the one or more thresholds are satisfied based on the set of periodic BFD-RSs. The aperiodic reference signal receiver 835 may be configured as or otherwise support a means for receiving the one or more aperiodic BFD-RSs based on the one or more thresholds being satisfied.

In some examples, the triggering threshold identification component 840 may be configured as or otherwise support a means for identifying a triggering threshold associated with the one or more aperiodic BFD-RSs of the one or more thresholds. In some examples, the UE threshold determination component 845 may be configured as or otherwise support a means for determining that a quantity of BFIs satisfy the triggering threshold, where receiving the one or more aperiodic BFD-RSs is based on the triggering threshold being satisfied. In some examples, the triggering threshold includes a threshold quantity of consecutive BFIs, a threshold quantity of cumulative BFIs, or a combination thereof. In some examples, the UE threshold determination component 845 may be configured as or otherwise support a means for determining that one or more measurements satisfy the triggering threshold, where receiving the one or more aperiodic BFD-RSs is based on the triggering threshold being satisfied. In some examples, the triggering threshold includes a threshold quantity of consecutive BFIs, a threshold quantity of cumulative BFIs, or a combination thereof. In some examples, the triggering threshold comprises a threshold channel quality metric, the one or more measurements comprise a signal to noise ratio, or a combination thereof.

In some examples, to support receiving the control signaling, the control signaling receiver 825 may be configured as or otherwise support a means for receiving a radio resource control message configuring the UE with the set of parameters.

In some examples, the set of parameters includes a consecutive BFI threshold, a cumulative BFI threshold, a quantity of reference signals in a burst of reference signals of the one or more aperiodic BFD-RSs, a periodicity of the burst of reference signals, a time interval between each reference signal of the burst of reference signals, or any combination thereof. In some examples, the control signaling indicates a set of multiple values for a respective parameter of the set of parameters.

In some examples, the physical layer message receiver 855 may be configured as or otherwise support a means for receiving a DCI message, a MAC-CE message, or a combination thereof indicating a value of the set of multiple values for the respective parameter. In some examples, the reference signal receiver 860 may be configured as or otherwise support a means for receiving the set of periodic BFD-RSs, the one or more aperiodic BFD-RSs, or a combination thereof.

In some examples, the UE threshold determination component 845 may be configured as or otherwise support a means for determining that the one or more thresholds are satisfied. In some examples, the uplink message transmitter 850 may be configured as or otherwise support a means for transmitting, to a base station, an uplink message requesting the one or more aperiodic BFD-RSs based on determining that the one or more thresholds are satisfied.

In some examples, the uplink message includes a request for a quantity of aperiodic BFD-RSs, a periodicity associated with the quantity of aperiodic BFD-RSs, a time interval between each reference signal of the quantity of aperiodic BFD-RSs, a request to change a periodicity associated with the set of periodic BFD-RSs, or any combination thereof.

In some examples, the control signaling receiver 825 may be configured as or otherwise support a means for receiving, from a base station, a control message indicating the one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof. In some examples, the periodic BFD-RSs and the one or more aperiodic BFD-RSs include SSBs, CSI-RSs, or any combination thereof.

Figure 9:
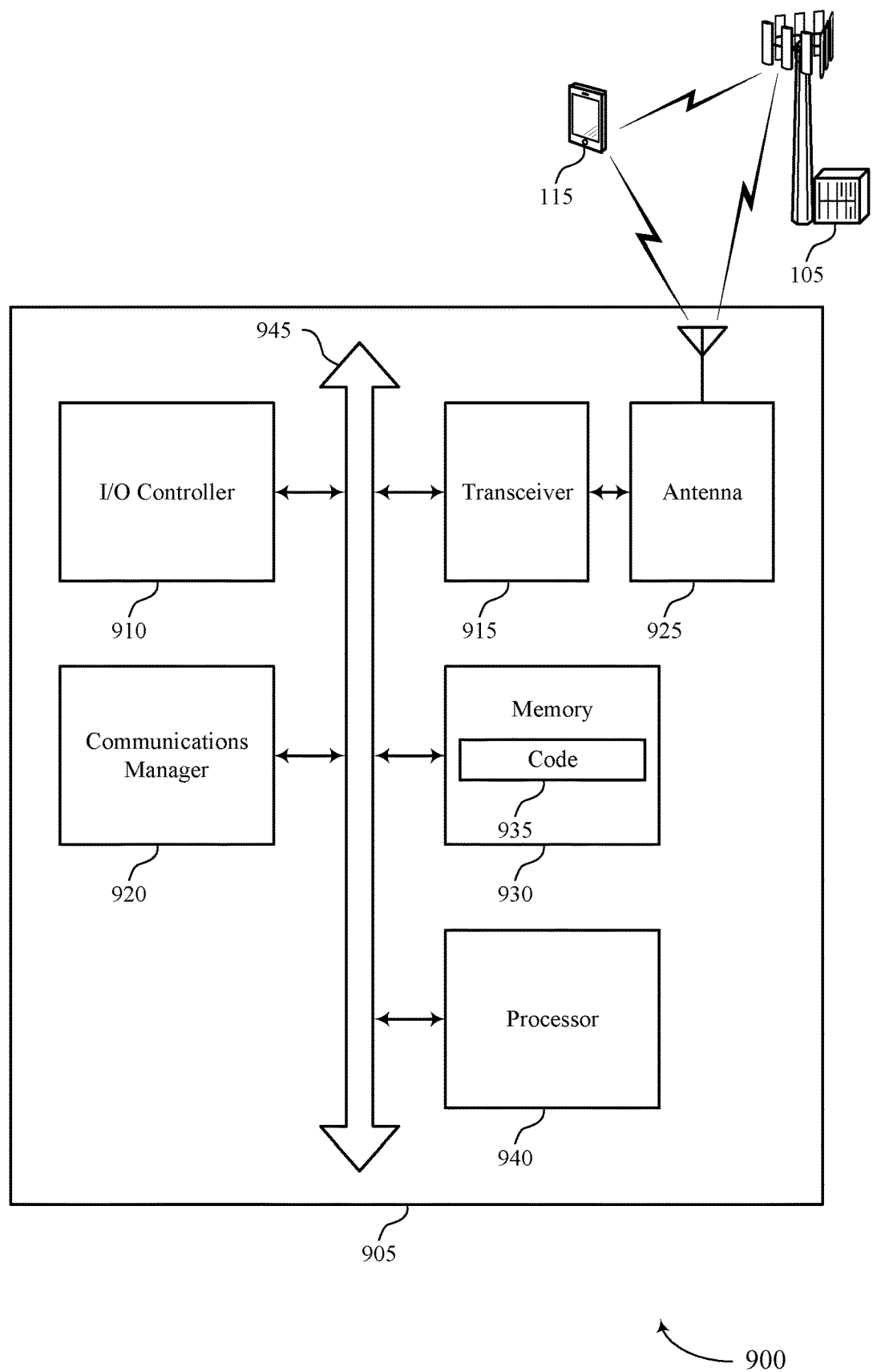
FIG. 9 shows a diagram of a system including a device that supports aperiodic beam failure detection reference signals for wireless communications systems in accordance with aspects of the present disclosure.

FIG. 9 shows a diagram of a system 900 including a device 905 that supports aperiodic beam failure detection reference signals for wireless communications systems in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting aperiodic BFD-RSs for wireless communications systems). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving control signaling indicating a set of parameters including one or more thresholds associated with initiating one or more aperiodic BFD-RSs. The communications manager 920 may be configured as or otherwise support a means for receiving a set of periodic BFD-RSs, where the one or more thresholds are satisfied based on the set of periodic BFD-RSs. The communications manager 920 may be configured as or otherwise support a means for receiving the one or more aperiodic BFD-RSs based on the one or more thresholds being satisfied.

By including or configuring the communications manager 920 in accordance with examples as described herein, the device 905 may support techniques for receiving aperiodic BFD-RSs, allowing the UE to detect beam failure faster, enhancing the efficiency of wireless communications.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of aperiodic BFD-RSs for wireless communications systems as described herein, or the processor 940 and the memory 930 may be otherwise configured to perform or support such operations.

Figure 10:
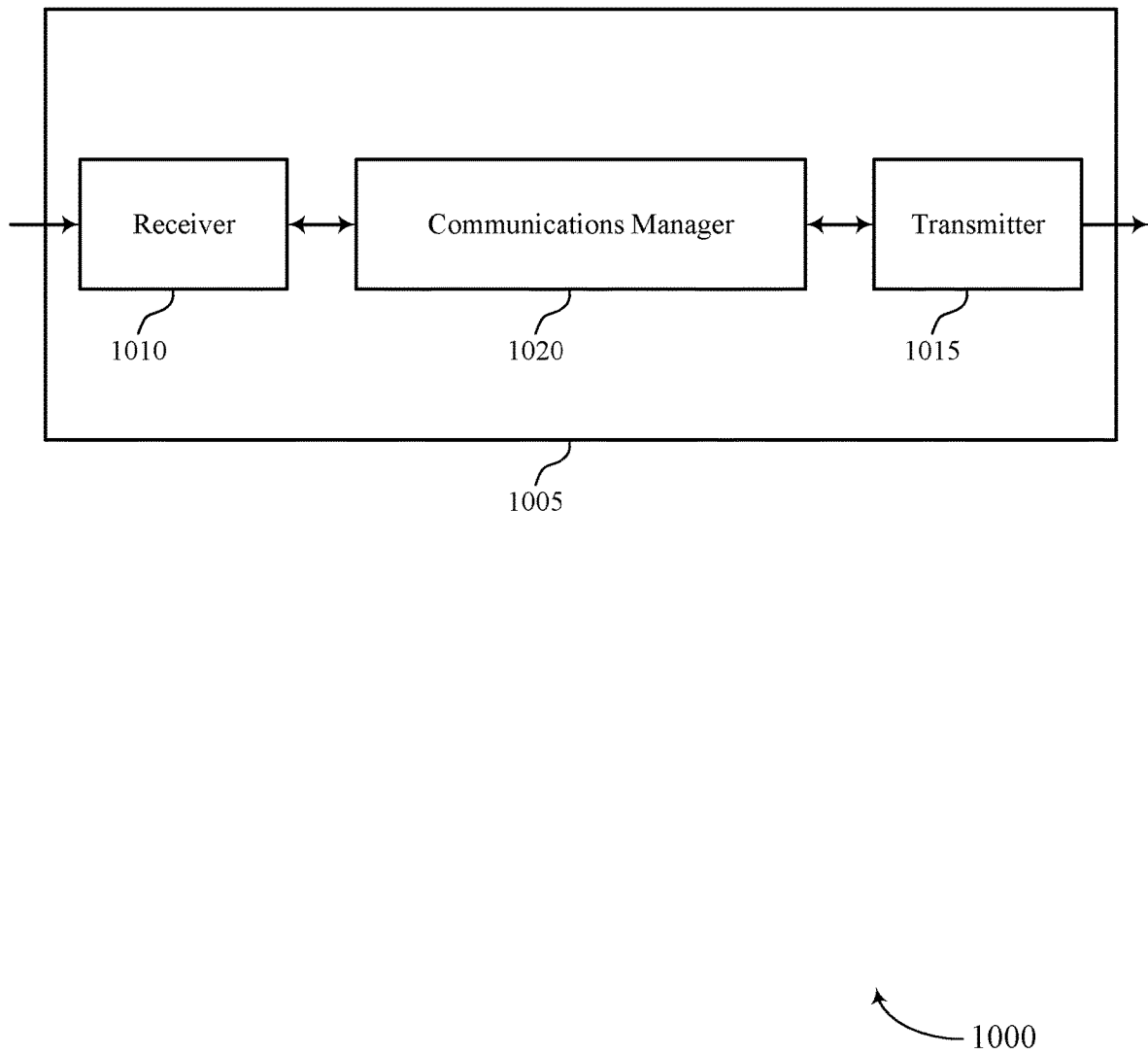
FIGS. 10 and 11 show block diagrams of devices that support aperiodic beam failure detection reference signals for wireless communications systems in accordance with aspects of the present disclosure.

FIG. 10 shows a block diagram 1000 of a device 1005 that supports aperiodic BFD-RSs for wireless communications systems in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to aperiodic BFD-RSs for wireless communications systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to aperiodic BFD-RSs for wireless communications systems). In some examples, the transmitter 1015 may be co-located with a receiver 1010 in a transceiver component. The transmitter 1015 may utilize a single antenna or a set of multiple antennas.

The communications manager 1020, the receiver 1010, the transmitter 1015, or various combinations thereof or various components thereof may be examples of means for performing various aspects of aperiodic BFD-RSs for wireless communications systems as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting control signaling indicating a set of parameters for a beam failure detection procedure, the set of parameters including one or more thresholds associated with initiating one or more aperiodic BFD-RSs. The communications manager 1020 may be configured as or otherwise support a means for transmitting a set of periodic BFD-RSs, where the one or more thresholds are satisfied based on the set of periodic BFD-RSs. The communications manager 1020 may be configured as or otherwise support a means for transmitting the one or more aperiodic BFD-RSs based on the one or more thresholds being satisfied.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for transmitting aperiodic BFD-RSs, allowing for faster detection of beam failure, lower latency communications, and enhanced communications efficiency.

Figure 11:
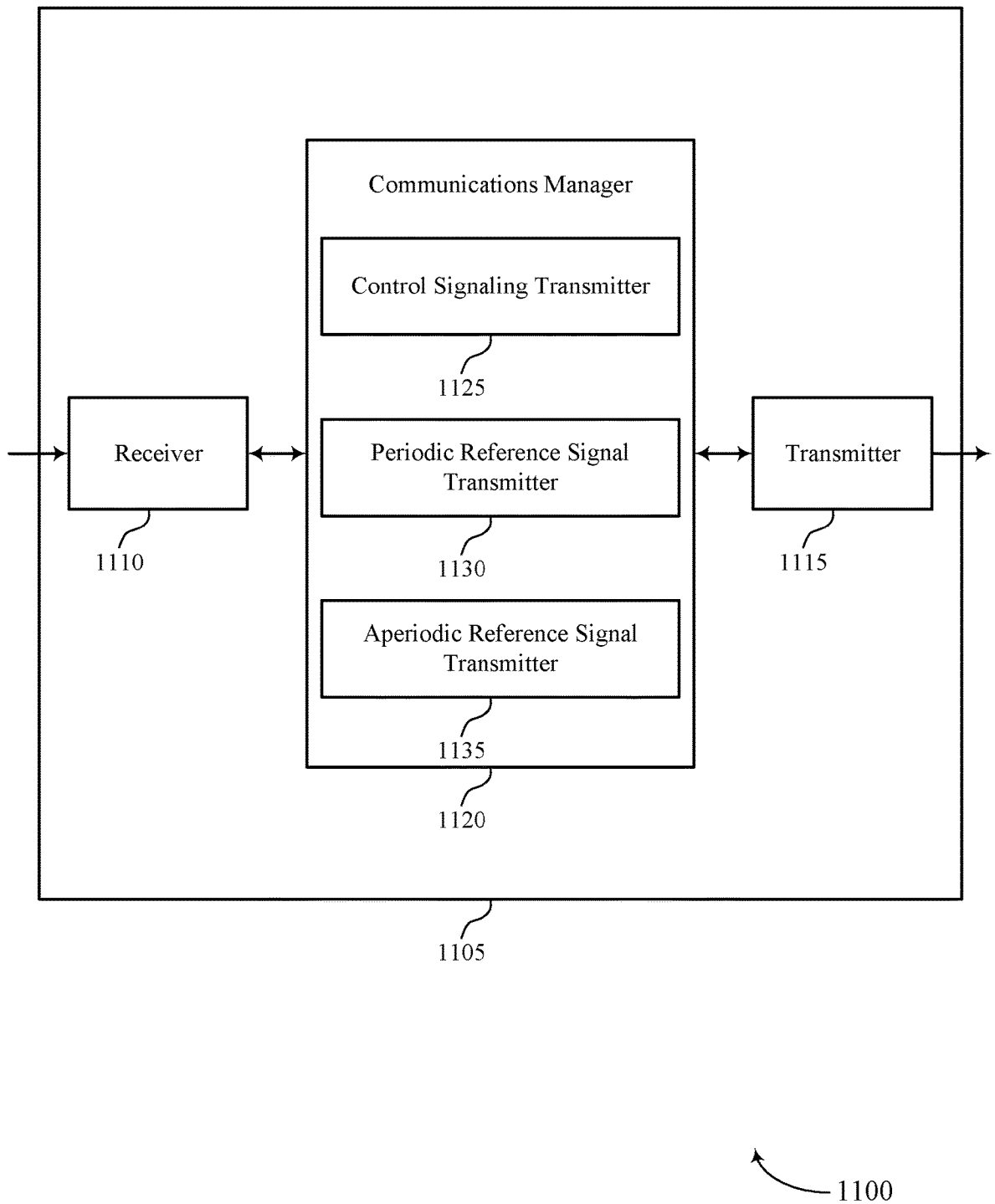

FIG. 11 shows a block diagram 1100 of a device 1105 that supports aperiodic beam failure detection reference signals for wireless communications systems in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to aperiodic BFD-RSs for wireless communications systems). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to aperiodic BFD-RSs for wireless communications systems). In some examples, the transmitter 1115 may be co-located with a receiver 1110 in a transceiver component. The transmitter 1115 may utilize a single antenna or a set of multiple antennas.

The device 1105, or various components thereof, may be an example of means for performing various aspects of aperiodic BFD-RSs for wireless communications systems as described herein. For example, the communications manager 1120 may include a control signaling transmitter 1125, a periodic reference signal transmitter 1130, an aperiodic reference signal transmitter 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The control signaling transmitter 1125 may be configured as or otherwise support a means for transmitting control signaling indicating a set of parameters for a beam failure detection procedure, the set of parameters including one or more thresholds associated with initiating one or more aperiodic BFD-RSs. The periodic reference signal transmitter 1130 may be configured as or otherwise support a means for transmitting a set of periodic BFD-RSs, where the one or more thresholds are satisfied based on the set of periodic BFD-RSs. The aperiodic reference signal transmitter 1135 may be configured as or otherwise support a means for transmitting the one or more aperiodic BFD-RSs based on the one or more thresholds being satisfied.

Figure 12:
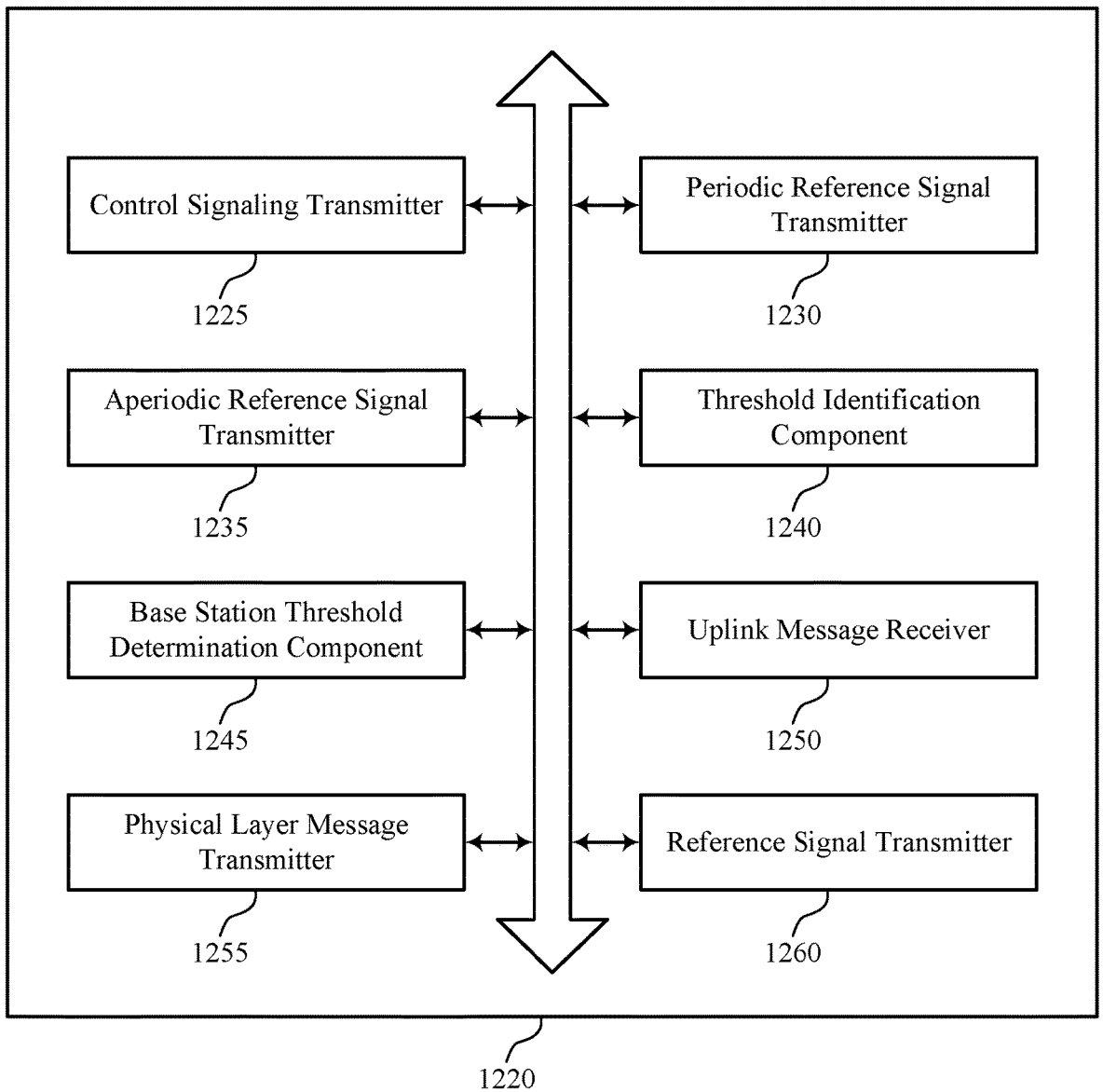
FIG. 12 shows a block diagram of a communications manager that supports aperiodic beam failure detection reference signals for wireless communications systems in accordance with aspects of the present disclosure.

FIG. 12 shows a block diagram 1200 of a communications manager 1220 that supports aperiodic beam failure detection reference signals for wireless communications systems in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of aperiodic BFD-RSs for wireless communications systems as described herein. For example, the communications manager 1220 may include a control signaling transmitter 1225, a periodic reference signal transmitter 1230, an aperiodic reference signal transmitter 1235, a threshold identification component 1240, a base station threshold determination component 1245, an uplink message receiver 1250, a physical layer message transmitter 1255, a reference signal transmitter 1260, or any combination thereof. Each of these components may communicate, directly or indirectly, with one another (e.g., via one or more buses).

The communications manager 1220 may support wireless communications at a base station in accordance with examples as disclosed herein. The control signaling transmitter 1225 may be configured as or otherwise support a means for transmitting control signaling indicating a set of parameters for a beam failure detection procedure, the set of parameters including one or more thresholds associated with initiating one or more aperiodic BFD-RSs. The periodic reference signal transmitter 1230 may be configured as or otherwise support a means for transmitting a set of periodic BFD-RSs, where the one or more thresholds are satisfied based on the set of periodic BFD-RSs. The aperiodic reference signal transmitter 1235 may be configured as or otherwise support a means for transmitting the one or more aperiodic BFD-RSs based on the one or more thresholds being satisfied.

In some examples, the threshold identification component 1240 may be configured as or otherwise support a means for identifying a triggering threshold associated with the one or more aperiodic BFD-RSs of the one or more thresholds. In some examples, the base station threshold determination component 1245 may be configured as or otherwise support a means for determining that one or more measurements satisfies the triggering threshold, where transmitting the one or more aperiodic BFD-RSs is based on the triggering threshold being satisfied. In some examples, the triggering threshold comprises a threshold channel quality metric, the one or more measurements comprise a signal to noise ratio, or a combination thereof.

In some examples, to support transmitting the control signaling, the control signaling transmitter 1225 may be configured as or otherwise support a means for transmitting a radio resource control message configuring the UE with the set of parameters.

In some examples, the set of parameters includes a consecutive BFI threshold, a cumulative BFI threshold, a quantity of reference signals in a burst of reference signals of the one or more aperiodic BFD-RSs, a periodicity of the burst of reference signals, a time interval between each reference signal of the burst of reference signals, or any combination thereof. In some examples, the control signaling indicates a set of multiple values for a respective parameter of the set of parameters.

In some examples, the physical layer message transmitter 1255 may be configured as or otherwise support a means for transmitting a DCI message, a MAC-CE message, or a combination thereof indicating a value of the set of multiple values for the respective parameter. In some examples, the reference signal transmitter 1260 may be configured as or otherwise support a means for transmitting the set of periodic BFD-RSs, the one or more aperiodic BFD-RSs, or a combination thereof.

In some examples, the uplink message receiver 1250 may be configured as or otherwise support a means for receiving, from a UE, an uplink message requesting the one or more aperiodic BFD-RSs based on the one or more thresholds being satisfied.

In some examples, the uplink message includes a request for a quantity of aperiodic BFD-RSs, a periodicity associated with the quantity of aperiodic BFD-RSs, a time interval between each reference signal of the quantity of aperiodic BFD-RSs, a request to change a periodicity associated with the set of periodic BFD-RSs, or any combination thereof.

In some examples, the base station threshold determination component 1245 may be configured as or otherwise support a means for determining that the one or more thresholds are satisfied. In some examples, the control signaling transmitter 1225 may be configured as or otherwise support a means for transmitting, to a UE, a control message indicating the one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof. In some examples, the periodic BFD-RSs and the one or more aperiodic BFD-RSs include SSBs, CSI-RSs, or any combination thereof.

Figure 13:
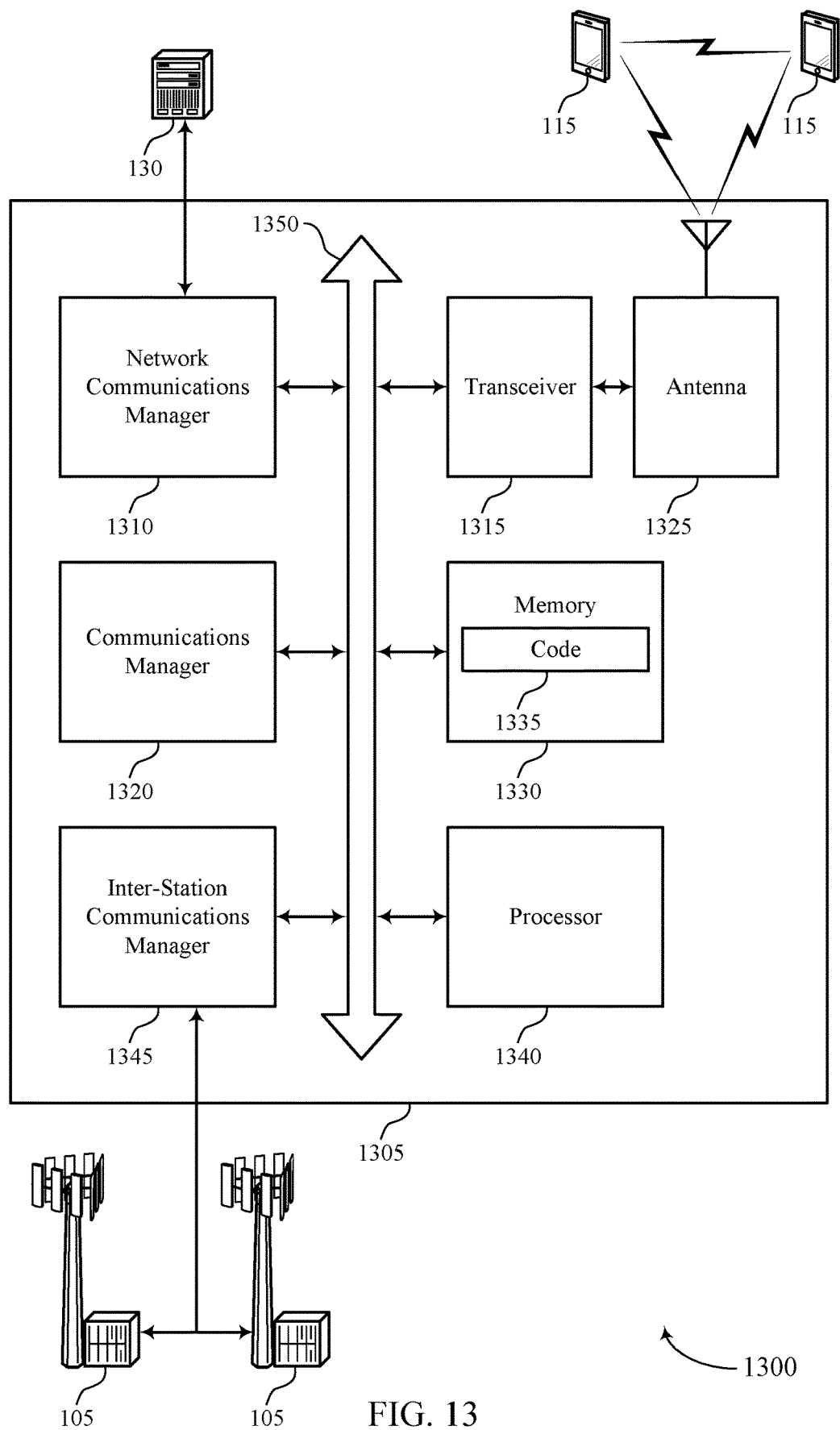
FIG. 13 shows a diagram of a system including a device that supports aperiodic beam failure detection reference signals for wireless communications systems in accordance with aspects of the present disclosure.

FIG. 13 shows a diagram of a system 1300 including a device 1305 that supports aperiodic beam failure detection reference signals for wireless communications systems in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting aperiodic BFD-RSs for wireless communications systems). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting control signaling indicating a set of parameters for a beam failure detection procedure, the set of parameters including one or more thresholds associated with initiating one or more aperiodic BFD-RSs. The communications manager 1320 may be configured as or otherwise support a means for transmitting a set of periodic BFD-RSs, where the one or more thresholds are satisfied based on the set of periodic BFD-RSs. The communications manager 1320 may be configured as or otherwise support a means for transmitting the one or more aperiodic BFD-RSs based on the one or more thresholds being satisfied.

By including or configuring the communications manager 1320 in accordance with examples as described herein, the device 1305 may support techniques for improved coordination between the base station and a UE, enabling the transmission of aperiodic BFD-RSs, resulting in lower latency communications and enhanced communications efficiency.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of aperiodic BFD-RSs for wireless communications systems as described herein, or the processor 1340 and the memory 1330 may be otherwise configured to perform or support such operations.

Figure 14:
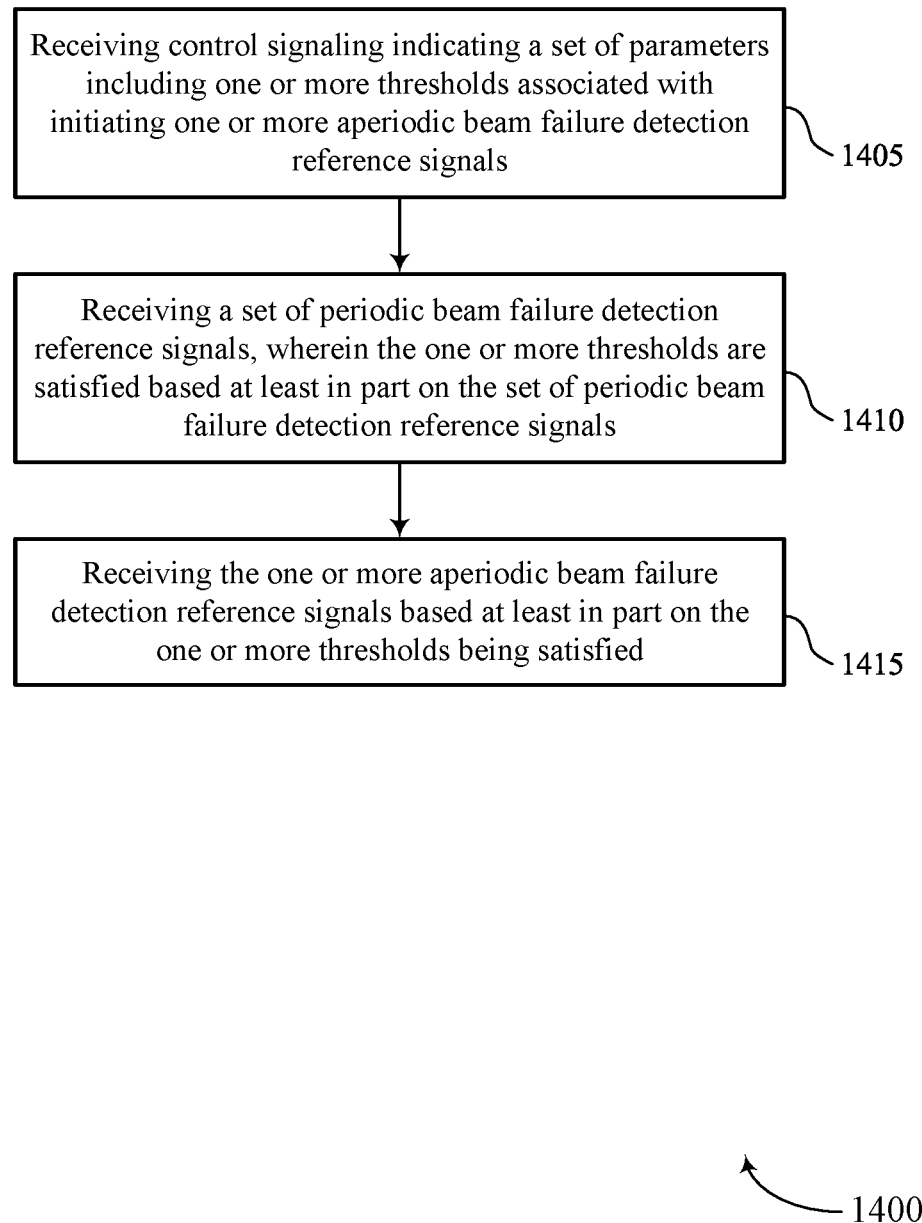
FIGS. 14 through 17 show flowcharts illustrating methods that support aperiodic beam failure detection reference signals for wireless communications systems in accordance with aspects of the present disclosure.

FIG. 14 shows a flowchart illustrating a method 1400 that supports aperiodic beam failure detection reference signals for wireless communications systems in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a set of parameters including one or more thresholds associated with initiating one or more aperiodic BFD-RSs. The operations of 1405 may be performed in accordance with examples as disclosed herein. In some examples, aspects of the operations of 1405 may be performed by a control signaling receiver 825 as described with reference to FIG. 8.

At 1410, the method may include receiving a set of periodic BFD-RSs, where the one or more thresholds are satisfied based on the set of periodic BFD-RSs. The operations of 1410 may be performed in accordance with examples as disclosed herein. In some examples, aspects of the operations of 1410 may be performed by a periodic reference signal receiver 830 as described with reference to FIG. 8.

At 1415, the method may include receiving the one or more aperiodic BFD-RSs based on the one or more thresholds being satisfied. The operations of 1415 may be performed in accordance with examples as disclosed herein. In some examples, aspects of the operations of 1415 may be performed by an aperiodic reference signal receiver 835 as described with reference to FIG. 8.

Figure 15:
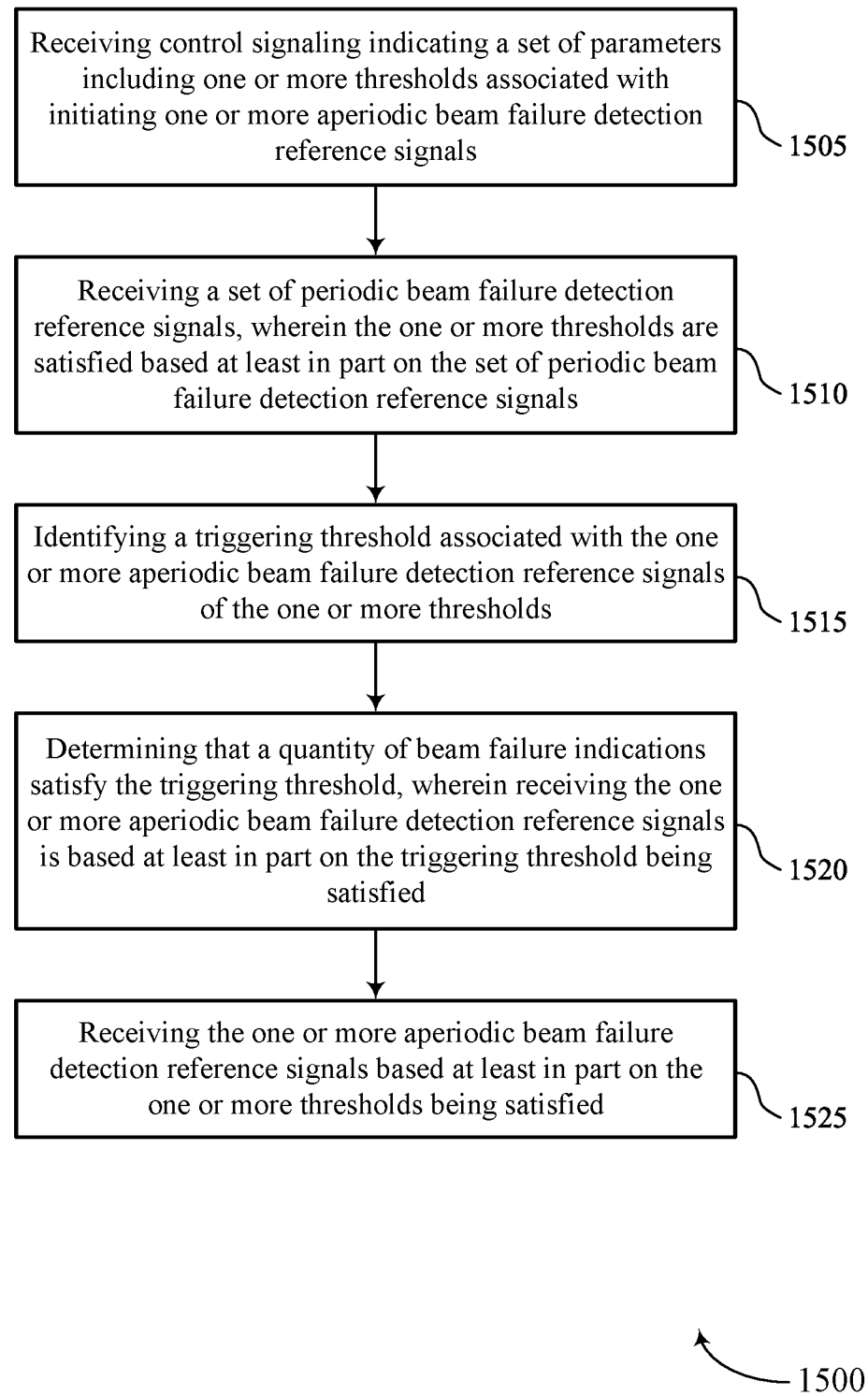

FIG. 15 shows a flowchart illustrating a method 1500 that supports aperiodic beam failure detection reference signals for wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a set of parameters including one or more thresholds associated with initiating one or more aperiodic BFD-RSs. The operations of 1505 may be performed in accordance with examples as disclosed herein. In some examples, aspects of the operations of 1505 may be performed by a control signaling receiver 825 as described with reference to FIG. 8.

At 1510, the method may include receiving a set of periodic BFD-RSs, where the one or more thresholds are satisfied based on the set of periodic BFD-RSs. The operations of 1510 may be performed in accordance with examples as disclosed herein. In some examples, aspects of the operations of 1510 may be performed by a periodic reference signal receiver 830 as described with reference to FIG. 8.

At 1515, the method may include identifying a triggering threshold associated with the one or more aperiodic BFD-RSs of the one or more thresholds. The operations of 1515 may be performed in accordance with examples as disclosed herein. In some examples, aspects of the operations of 1515 may be performed by a triggering threshold identification component 840 as described with reference to FIG. 8.

At 1520, the method may include determining that a quantity of BFIs satisfy the triggering threshold, where receiving the one or more aperiodic BFD-RSs is based on the triggering threshold being satisfied. The operations of 1520 may be performed in accordance with examples as disclosed herein. In some examples, aspects of the operations of 1520 may be performed by a UE threshold determination component 845 as described with reference to FIG. 8.

At 1525, the method may include receiving the one or more aperiodic BFD-RSs based on the one or more thresholds being satisfied. The operations of 1525 may be performed in accordance with examples as disclosed herein. In some examples, aspects of the operations of 1525 may be performed by an aperiodic reference signal receiver 835 as described with reference to FIG. 8.

Figure 16:
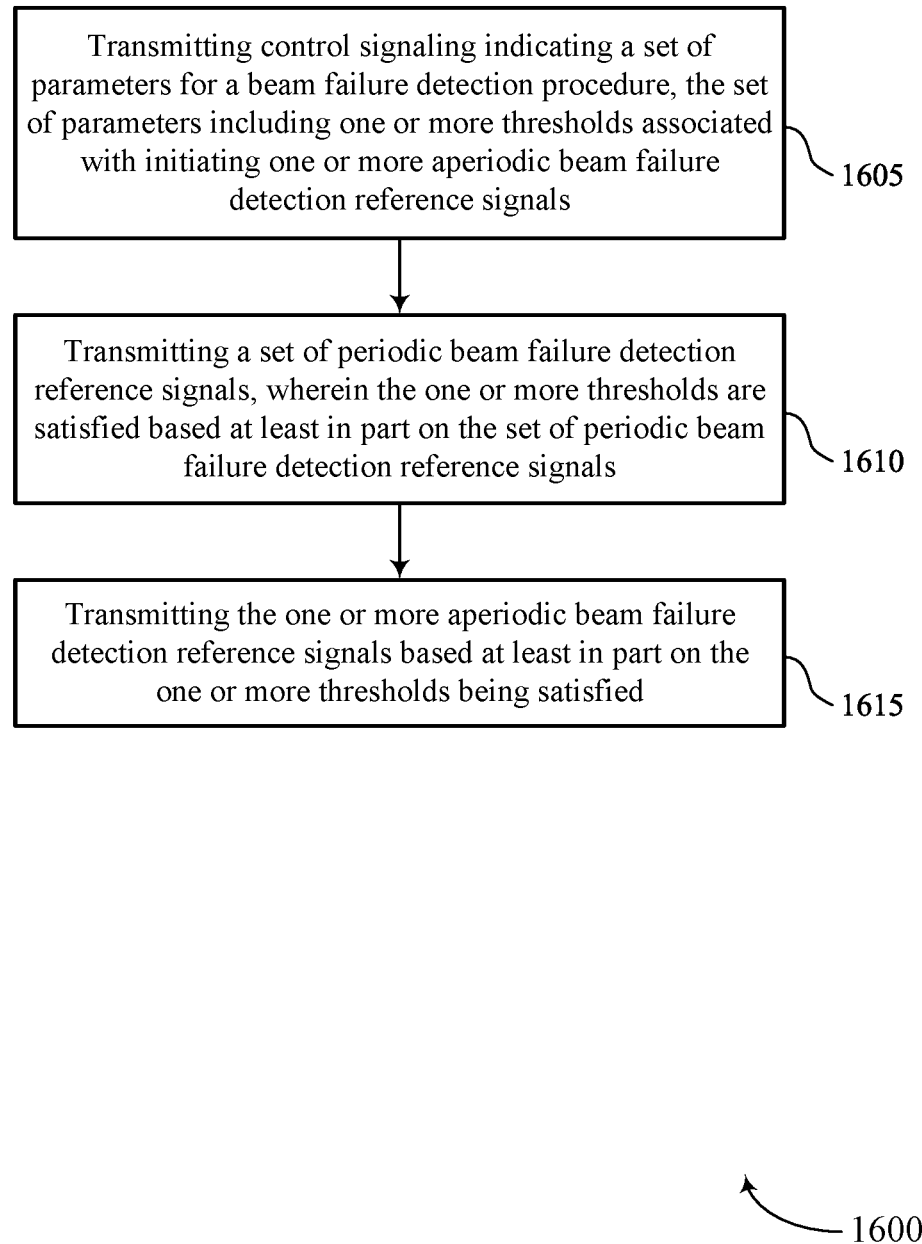

FIG. 16 shows a flowchart illustrating a method 1600 that supports aperiodic beam failure detection reference signals for wireless communications systems in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include transmitting control signaling indicating a set of parameters for a beam failure detection procedure, the set of parameters including one or more thresholds associated with initiating one or more aperiodic BFD-RSs. The operations of 1605 may be performed in accordance with examples as disclosed herein. In some examples, aspects of the operations of 1605 may be performed by a control signaling transmitter 1225 as described with reference to FIG. 12.

At 1610, the method may include transmitting a set of periodic BFD-RSs, where the one or more thresholds are satisfied based on the set of periodic BFD-RSs. The operations of 1610 may be performed in accordance with examples as disclosed herein. In some examples, aspects of the operations of 1610 may be performed by a periodic reference signal transmitter 1230 as described with reference to FIG. 12.

At 1615, the method may include transmitting the one or more aperiodic BFD-RSs based on the one or more thresholds being satisfied. The operations of 1615 may be performed in accordance with examples as disclosed herein. In some examples, aspects of the operations of 1615 may be performed by an aperiodic reference signal transmitter 1235 as described with reference to FIG. 12.

Figure 17:
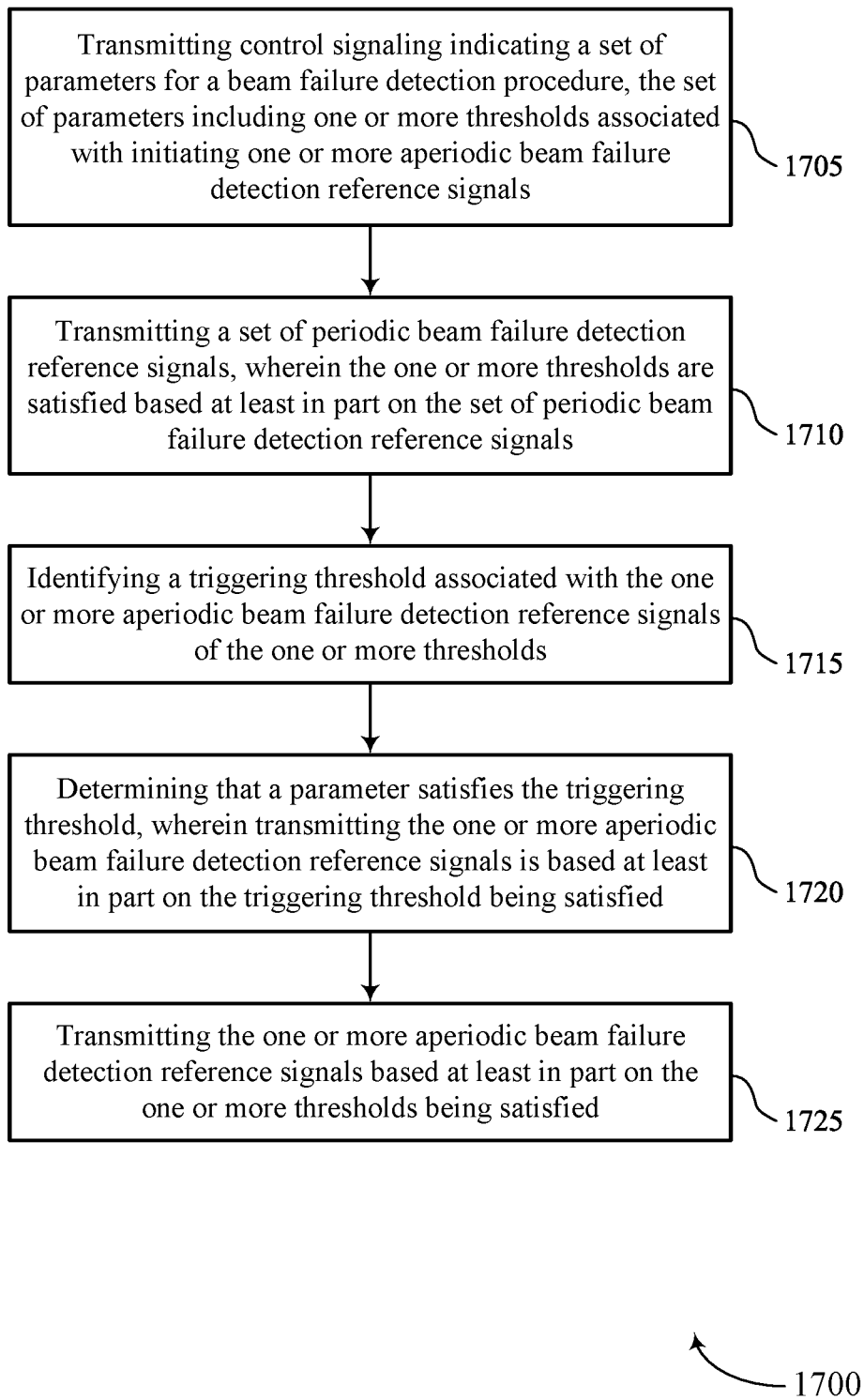

FIG. 17 shows a flowchart illustrating a method 1700 that supports aperiodic beam failure detection reference signals for wireless communications systems in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting control signaling indicating a set of parameters for a beam failure detection procedure, the set of parameters including one or more thresholds associated with initiating one or more aperiodic BFD-RSs. The operations of 1705 may be performed in accordance with examples as disclosed herein. In some examples, aspects of the operations of 1705 may be performed by a control signaling transmitter 1225 as described with reference to FIG. 12.

At 1710, the method may include transmitting a set of periodic BFD-RSs, where the one or more thresholds are satisfied based on the set of periodic BFD-RSs. The operations of 1710 may be performed in accordance with examples as disclosed herein. In some examples, aspects of the operations of 1710 may be performed by a periodic reference signal transmitter 1230 as described with reference to FIG. 12.

At 1715, the method may include identifying a triggering threshold associated with the one or more aperiodic BFD-RSs of the one or more thresholds. The operations of 1715 may be performed in accordance with examples as disclosed herein. In some examples, aspects of the operations of 1715 may be performed by a threshold identification component 1240 as described with reference to FIG. 12.

At 1720, the method may include determining that one or more measurements satisfies the triggering threshold, where transmitting the one or more aperiodic BFD-RSs is based on the triggering threshold being satisfied. The operations of 1720 may be performed in accordance with examples as disclosed herein. In some examples, aspects of the operations of 1720 may be performed by a base station threshold determination component 1245 as described with reference to FIG. 12.

At 1725, the method may include transmitting the one or more aperiodic BFD-RSs based on the one or more thresholds being satisfied. The operations of 1725 may be performed in accordance with examples as disclosed herein. In some examples, aspects of the operations of 1725 may be performed by an aperiodic reference signal transmitter 1235 as described with reference to FIG. 12.

The following provides an overview of aspects of the present disclosure:

Aspect 1: A method for wireless communications at a UE, comprising: receiving control signaling indicating a set of parameters including one or more thresholds associated with initiating one or more aperiodic BFD-RSs; receiving a set of periodic BFD-RSs, wherein the one or more thresholds are satisfied based at least in part on the set of periodic BFD-RSs; and receiving the one or more aperiodic BFD-RSs based at least in part on the one or more thresholds being satisfied.

Aspect 2: The method of aspect 1, further comprising: identifying a triggering threshold associated with the one or more aperiodic BFD-RSs of the one or more thresholds; determining that a quantity of BFIs satisfy the triggering threshold, wherein receiving the one or more aperiodic BFD-RSs is based at least in part on the triggering threshold being satisfied.

Aspect 3: The method of aspect 2, wherein the triggering threshold comprises a threshold quantity of consecutive BFIs, a threshold quantity of cumulative BFIs, or a combination thereof.

Aspect 4: The method of any of aspects 1 through 3, further comprising: identifying a triggering threshold associated with the one or more aperiodic BFD-RSs of the one or more thresholds; determining that one or more measurements satisfy the triggering threshold, wherein receiving the one or more aperiodic BFD-RSs is based at least in part on the triggering threshold being satisfied.

Aspect 5: The method of aspect 4, wherein the triggering threshold comprises a threshold channel quality metric, the one or more measurements comprise a signal to noise ratio, or a combination thereof.

Aspect 6: The method of any of aspects 1 through 5, wherein receiving the control signaling comprises: receiving a radio resource control message configuring the UE with the set of parameters.

Aspect 7: The method of any of aspects 1 through 6, wherein the set of parameters comprises a consecutive BFI threshold, a cumulative BFI threshold, a quantity of reference signals in a burst of reference signals of the one or more aperiodic BFD-RSs, a periodicity of the burst of reference signals, a time interval between each reference signal of the burst of reference signals, or any combination thereof.

Aspect 8: The method of any of aspects 1 through 7, wherein the control signaling indicates a plurality of values for a respective parameter of the set of parameters.

Aspect 9: The method of aspect 8, further comprising: receiving a DCI message, a MAC-CE message, or a combination thereof indicating a value of the plurality of values for the respective parameter; and receiving the set of periodic BFD-RSs, the one or more aperiodic BFD-RSs, or a combination thereof.

Aspect 10: The method of any of aspects 1 through 9, further comprising: determining that the one or more thresholds are satisfied; and transmitting, to a base station, an uplink message requesting the one or more aperiodic BFD-RSs based at least in part on determining that the one or more thresholds are satisfied.

Aspect 11: The method of aspect 10, wherein the uplink message comprises a request for a quantity of aperiodic BFD-RSs, a periodicity associated with the quantity of aperiodic BFD-RSs, a time interval between each reference signal of the quantity of aperiodic BFD-RSs, a request to change a periodicity associated with the set of periodic BFD-RSs, or any combination thereof.

Aspect 12: The method of any of aspects 1 through 11, further comprising: receiving, from a base station, a control message indicating the one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof.

Aspect 13: The method of any of aspects 1 through 12, wherein the set of periodic BFD-RSs and the one or more aperiodic BFD-RSs comprise SSBs, CSI-RSs, or any combination thereof.

Aspect 14: A method for wireless communications at a base station, comprising: transmitting control signaling indicating a set of parameters for a beam failure detection procedure, the set of parameters including one or more thresholds associated with initiating one or more aperiodic BFD-RSs; transmitting a set of periodic BFD-RSs, wherein the one or more thresholds are satisfied based at least in part on the set of periodic BFD-RSs; and transmitting the one or more aperiodic BFD-RSs based at least in part on the one or more thresholds being satisfied.

Aspect 15: The method of aspect 14, further comprising: identifying a triggering threshold associated with the one or more aperiodic BFD-RSs of the one or more thresholds; determining that one or more measurements satisfies the triggering threshold, wherein transmitting the one or more aperiodic BFD-RSs is based at least in part on the triggering threshold being satisfied.

Aspect 16: The method of aspect 15, wherein the triggering threshold comprises a threshold channel quality metric, the one or more measurements comprise a signal to noise ratio, or a combination thereof.

Aspect 17: The method of any of aspects 14 through 16, wherein transmitting the control signaling comprises: transmitting a radio resource control message configuring a UE with the set of parameters.

Aspect 18: The method of any of aspects 14 through 17, wherein the set of parameters comprises a consecutive BFI threshold, a cumulative BFI threshold, a quantity of reference signals in a burst of reference signals of the one or more aperiodic BFD-RSs, a periodicity of the burst of reference signals, a time interval between each reference signal of the burst of reference signals, or any combination thereof.

Aspect 19: The method of any of aspects 14 through 18, wherein the control signaling indicates a plurality of values for a respective parameter of the set of parameters.

Aspect 20: The method of aspect 19, further comprising: transmitting a DCI message, a MAC-CE message, or a combination thereof indicating a value of the plurality of values for the respective parameter; and transmitting the set of periodic BFD-RSs, the one or more aperiodic BFD-RSs, or a combination thereof.

Aspect 21: The method of any of aspects 14 through 20, further comprising: receiving, from a UE, an uplink message requesting the one or more aperiodic BFD-RSs based at least in part on the one or more thresholds being satisfied.

Aspect 22: The method of aspect 21, wherein the uplink message comprises a request for a quantity of aperiodic BFD-RSs, a periodicity associated with the quantity of aperiodic BFD-RSs, a time interval between each reference signal of the quantity of aperiodic BFD-RSs, a request to change a periodicity associated with the set of periodic BFD-RSs, or any combination thereof.

Aspect 23: The method of any of aspects 14 through 22, further comprising: determining that the one or more thresholds are satisfied; and transmitting, to a UE, a control message indicating the one or more aperiodic BFD-RSs, a periodicity associated with a quantity of the one or more aperiodic BFD-RSs, a time interval between each reference signal of the quantity of the one or more aperiodic BFD-RSs, an updated periodicity associated with the set of periodic BFD-RSs, or any combination thereof.

Aspect 24: The method of any of aspects 14 through 23, wherein the set of periodic BFD-RSs and the one or more aperiodic BFD-RSs comprise SSBs, CSI-RSs, or any combination thereof.

Aspect 25: An apparatus for wireless communications at a UE, comprising a processor; memory coupled with the processor; and instructions stored in the memory and executable by the processor to cause the apparatus to perform a method of any of aspects 1 through 13.

Aspect 26: An apparatus for wireless communications at a UE, comprising at least one means for performing a method of any of aspects 1 through 13.

Aspect 27: A non-transitory computer-readable medium storing code for wireless communications at a UE, the code comprising instructions executable by a processor to perform a method of any of aspects 1 through 13.

Aspect 28: An apparatus for wireless communications at a base station, comprising a processor; memory coupled with the processor; and instructions stored in the memory and executable by the processor to cause the apparatus to perform a method of any of aspects 14 through 24.

Aspect 29: An apparatus for wireless communications at a base station, comprising at least one means for performing a method of any of aspects 14 through 24.

Aspect 30: A non-transitory computer-readable medium storing code for wireless communications at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling indicating a set of parameters including one or more thresholds associated with initiating one or more aperiodic beam failure detection reference signals;
   receiving a set of periodic beam failure detection reference signals, wherein the one or more thresholds are satisfied based at least in part on the set of periodic beam failure detection reference signals; and
   receiving the one or more aperiodic beam failure detection reference signals based at least in part on the one or more thresholds being satisfied by one or more channel quality measurements of the set of periodic beam failure detection reference signals.

2. The method of claim 1, further comprising:
   identifying a triggering threshold associated with the one or more aperiodic beam failure detection reference signals of the one or more thresholds; and
   determining that a quantity of beam failure indications satisfy the triggering threshold, wherein receiving the one or more aperiodic beam failure detection reference signals is based at least in part on the triggering threshold being satisfied.

3. The method of claim 2, wherein the triggering threshold comprises a threshold quantity of consecutive beam failure indications, a threshold quantity of cumulative beam failure indications, or a combination thereof.

4. The method of claim 1, further comprising:
   identifying a triggering threshold associated with the one or more aperiodic beam failure detection reference signals of the one or more thresholds; and
   determining that one or more measurements satisfy the triggering threshold, wherein receiving the one or more aperiodic beam failure detection reference signals is based at least in part on the triggering threshold being satisfied.

5. The method of claim 4, wherein the triggering threshold comprises a threshold channel quality metric, the one or more measurements comprise a signal to noise ratio, or a combination thereof.

6. The method of claim 1, wherein receiving the control signaling comprises:
   receiving a radio resource control message configuring the UE with the set of parameters.

7. The method of claim 1, wherein the set of parameters comprises a consecutive beam failure indication threshold, a cumulative beam failure indication threshold, a quantity of reference signals in a burst of reference signals of the one or more aperiodic beam failure detection reference signals, a periodicity of the burst of reference signals, a time interval between each reference signal of the burst of reference signals, or any combination thereof.

8. The method of claim 1, wherein the control signaling indicates a plurality of values for a respective parameter of the set of parameters.

9. The method of claim 8, further comprising:
   receiving a downlink control information message, a medium access control control element message, or a combination thereof indicating a value of the plurality of values for the respective parameter; and
   receiving the set of periodic beam failure detection reference signals, the one or more aperiodic beam failure detection reference signals, or a combination thereof.

10. The method of claim 1, further comprising:
    determining that the one or more thresholds are satisfied; and
    transmitting, to a base station, an uplink message requesting the one or more aperiodic beam failure detection reference signals based at least in part on determining that the one or more thresholds are satisfied.

11. The method of claim 10, wherein the uplink message comprises a request for a quantity of aperiodic beam failure detection reference signals, a periodicity associated with the quantity of aperiodic beam failure detection reference signals, a time interval between each reference signal of the quantity of aperiodic beam failure detection reference signals, a request to change a periodicity associated with the set of periodic beam failure detection reference signals, or any combination thereof.

12. The method of claim 1, further comprising:
receiving, from a base station, a control message indicating the one or more aperiodic beam failure detection reference signals, a periodicity associated with a quantity of the one or more aperiodic beam failure detection reference signals, a time interval between each reference signal of the quantity of the one or more aperiodic beam failure detection reference signals, an updated periodicity associated with the set of periodic beam failure detection reference signals, or any combination thereof.

13. The method of claim 1, wherein the set of periodic beam failure detection reference signals and the one or more aperiodic beam failure detection reference signals comprise synchronization signal blocks, channel state information reference signals, or any combination thereof.

14. A method for wireless communications at a base station, comprising:
transmitting control signaling indicating a set of parameters for a beam failure detection procedure, the set of parameters including one or more thresholds associated with initiating one or more aperiodic beam failure detection reference signals;
transmitting a set of periodic beam failure detection reference signals, wherein the one or more thresholds are satisfied based at least in part on the set of periodic beam failure detection reference signals; and
transmitting the one or more aperiodic beam failure detection reference signals based at least in part on the one or more thresholds being satisfied by one or more channel quality measurements of the set of periodic beam failure detection reference signals.

15. The method of claim 14, further comprising:
identifying a triggering threshold associated with the one or more aperiodic beam failure detection reference signals of the one or more thresholds; and
determining that one or more measurements satisfies the triggering threshold, wherein transmitting the one or more aperiodic beam failure detection reference signals is based at least in part on the triggering threshold being satisfied.

16. The method of claim 15, wherein the triggering threshold comprises a threshold channel quality metric, the one or more measurements comprise a signal to noise ratio, or a combination thereof.

17. The method of claim 14, wherein transmitting the control signaling comprises:
transmitting a radio resource control message configuring a UE with the set of parameters.

18. The method of claim 14, wherein the set of parameters comprises a consecutive beam failure indication threshold, a cumulative beam failure indication threshold, a quantity of reference signals in a burst of reference signals of the one or more aperiodic beam failure detection reference signals, a periodicity of the burst of reference signals, a time interval between each reference signal of the burst of reference signals, or any combination thereof.

19. The method of claim 14, wherein the control signaling indicates a plurality of values for a respective parameter of the set of parameters.

20. The method of claim 19, further comprising:
transmitting a downlink control information message, a medium access control control element message, or a combination thereof indicating a value of the plurality of values for the respective parameter; and
transmitting the set of periodic beam failure detection reference signals, the one or more aperiodic beam failure detection reference signals, or a combination thereof.

21. The method of claim 14, further comprising:
receiving, from a user equipment (UE), an uplink message requesting the one or more aperiodic beam failure detection reference signals based at least in part on the one or more thresholds being satisfied.

22. The method of claim 21, wherein the uplink message comprises a request for a quantity of aperiodic beam failure detection reference signals, a periodicity associated with the quantity of aperiodic beam failure detection reference signals, a time interval between each reference signal of the quantity of aperiodic beam failure detection reference signals, a request to change a periodicity associated with the set of periodic beam failure detection reference signals, or any combination thereof.

23. The method of claim 14, further comprising:
determining that the one or more thresholds are satisfied; and
transmitting, to a user equipment (UE), a control message indicating the one or more aperiodic beam failure detection reference signals, a periodicity associated with a quantity of the one or more aperiodic beam failure detection reference signals, a time interval between each reference signal of the quantity of the one or more aperiodic beam failure detection reference signals, an updated periodicity associated with the set of periodic beam failure detection reference signals, or any combination thereof.

24. The method of claim 14, wherein the set of periodic beam failure detection reference signals and the one or more aperiodic beam failure detection reference signals comprise synchronization signal blocks, channel state information reference signals, or any combination thereof.

25. An apparatus for wireless communications at a user equipment (UE), comprising:
a processor;
memory coupled with the processor; and
instructions stored in the memory and executable by the processor to cause the apparatus to:
receive control signaling indicating a set of parameters including one or more thresholds associated with initiating one or more aperiodic beam failure detection reference signals;
receive a set of periodic beam failure detection reference signals, wherein the one or more thresholds are satisfied based at least in part on the set of periodic beam failure detection reference signals; and
receive the one or more aperiodic beam failure detection reference signals based at least in part on the one or more thresholds being satisfied by one or more channel quality measurements of the set of periodic beam failure detection reference signals.

26. The apparatus of claim 25, wherein the instructions are further executable by the processor to cause the apparatus to:
identify a triggering threshold associated with the one or more aperiodic beam failure detection reference signals of the one or more thresholds; and determine that a quantity of beam failure indications satisfy the triggering threshold, wherein receiving the one or more aperiodic beam failure detection reference signals is based at least in part on the triggering threshold being satisfied.

27. The apparatus of claim 26, wherein the triggering threshold comprises a threshold quantity of consecutive beam failure indications, a threshold quantity of cumulative beam failure indications, or a combination thereof.

28. The apparatus of claim 25, wherein the instructions are further executable by the processor to cause the apparatus to:
- determine that the one or more thresholds are satisfied; and
- transmit, to a base station, an uplink message requesting the one or more aperiodic beam failure detection reference signals based at least in part on determining that the one or more thresholds are satisfied.

29. An apparatus for wireless communications at a base station, comprising:
- a processor;
- memory coupled with the processor; and
- instructions stored in the memory and executable by the processor to cause the apparatus to:
  - transmit control signaling indicating a set of parameters for a beam failure detection procedure, the set of parameters including one or more thresholds associated with initiating one or more aperiodic beam failure detection reference signals;
  - transmit a set of periodic beam failure detection reference signals, wherein the one or more thresholds are satisfied based at least in part on the set of periodic beam failure detection reference signals; and
  - transmit the one or more aperiodic beam failure detection reference signals based at least in part on the one or more thresholds being satisfied by one or more channel quality measurements of the set of periodic beam failure detection reference signals.

30. The apparatus of claim 29, wherein the instructions are further executable by the processor to cause the apparatus to:
- identify a triggering threshold associated with the one or more aperiodic beam failure detection reference signals of the one or more thresholds; and
- determine that a parameter satisfies the triggering threshold, wherein transmitting the one or more aperiodic beam failure detection reference signals is based at least in part on the triggering threshold being satisfied.

* * * * *